(12) United States Patent
Yabe

(10) Patent No.: US 8,760,699 B2
(45) Date of Patent: Jun. 24, 2014

(54) PRINTING SYSTEM, PRINTING CONTROL METHOD FOR PRINTING SYSTEM, PRINTING APPARATUS AND SERVER

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/454,463

(22) Filed: Apr. 24, 2012

(65) Prior Publication Data

US 2012/0274982 A1 Nov. 1, 2012

(30) Foreign Application Priority Data

Apr. 27, 2011 (JP) ................................. 2011-100133

(51) Int. Cl.
*G06F 3/12* (2006.01)
*G06K 15/00* (2006.01)
(52) U.S. Cl.
USPC .......................... 358/1.15; 358/1.13; 358/1.12
(58) Field of Classification Search
USPC ...................... 358/1.12, 1.13, 1.15
See application file for complete search history.

(56) References Cited

U.S. PATENT DOCUMENTS 6,687,742 B1 * 2/2004 Iwazaki ......................... 709/206
2006/0155810 A1 * 7/2006 Butcher ........................ 709/206

FOREIGN PATENT DOCUMENTS

JP 2003-141021 A 5/2003

* cited by examiner

*Primary Examiner* — Douglas Tran
*Assistant Examiner* — Justin Katzwhite
(74) *Attorney, Agent, or Firm* — Carter, DeLuca, Farrell & Schmidt, LLP

(57) ABSTRACT

A terminal transmits a first e-mail to which a file to be printed is attached to a server, and the server temporarily saves the file attached to the first e-mail. The server transmits a second e-mail for confirming a user to the terminal, and the terminal returns information on the user to the server in response to the second e-mail. When the server has acquired the information on the user, the server converts the file temporarily saved into a file for printing and registers the converted file in the server. The server transmits the registered file for printing to a printing apparatus to cause the printing apparatus to print the file.

6 Claims, 21 Drawing Sheets

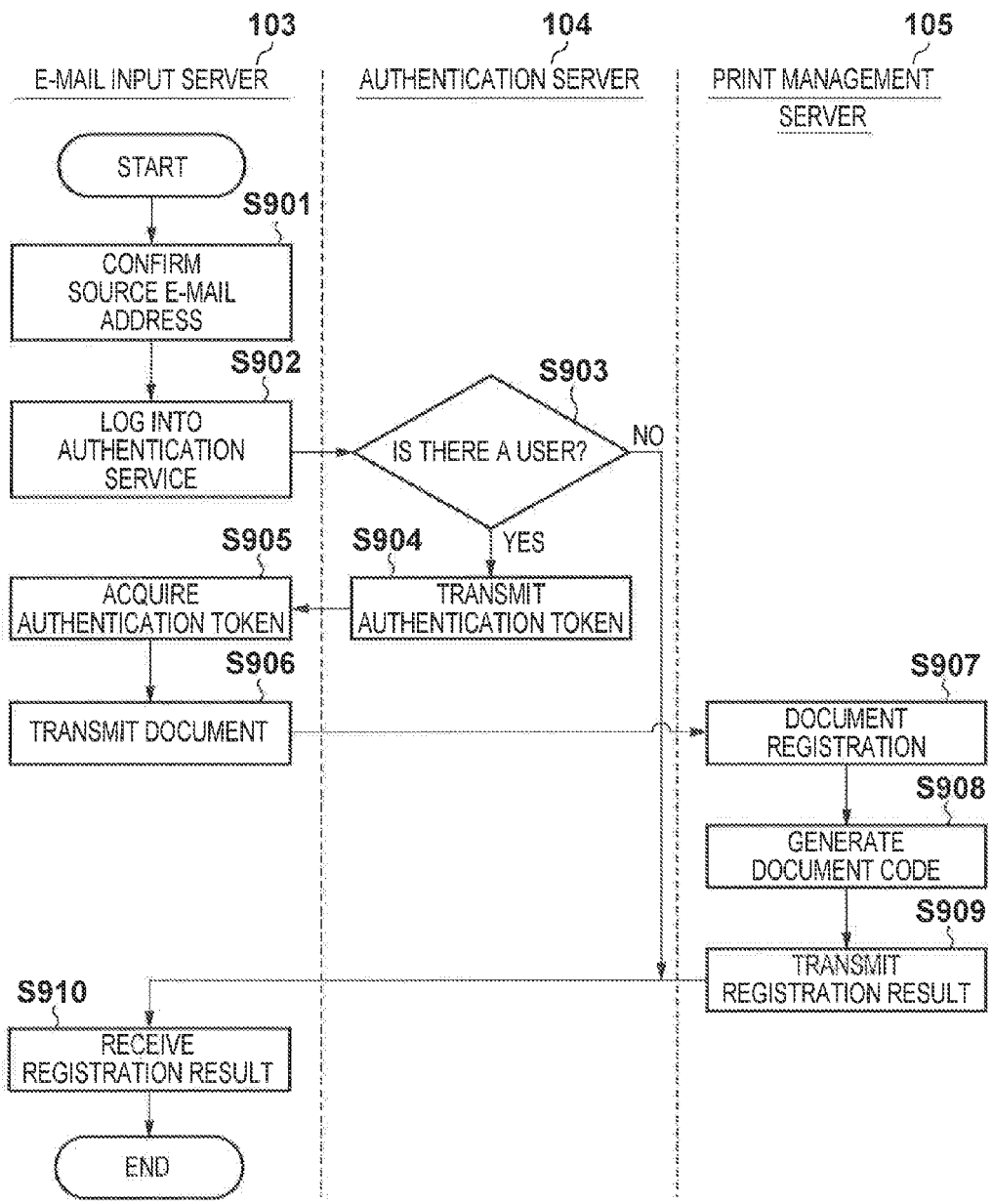

F I G. 10A

1001

PRINT REQUEST FOR "YYY.PDF" HAS BEEN ACCEPTED FROM USER "XXX".
ACCESS THE FOLLOWING URL TO COMPLETE INPUT PROCESSING.

INPUT CONFIRMATION PAGE URL:
http://canon.com/mailprint/confirm?document_code=11qo90euir45

F I G. 10B

1002

ERROR:
DOCUMENT REGISTRATION HAS FAILED.
NO DOCUMENT TO BE PRINTED IS ATTACHED

F I G. 10C

1003

ERROR:
DOCUMENT REGISTRATION HAS FAILED.
ATTACHED DOCUMENT CANNOT BE PRINTED.

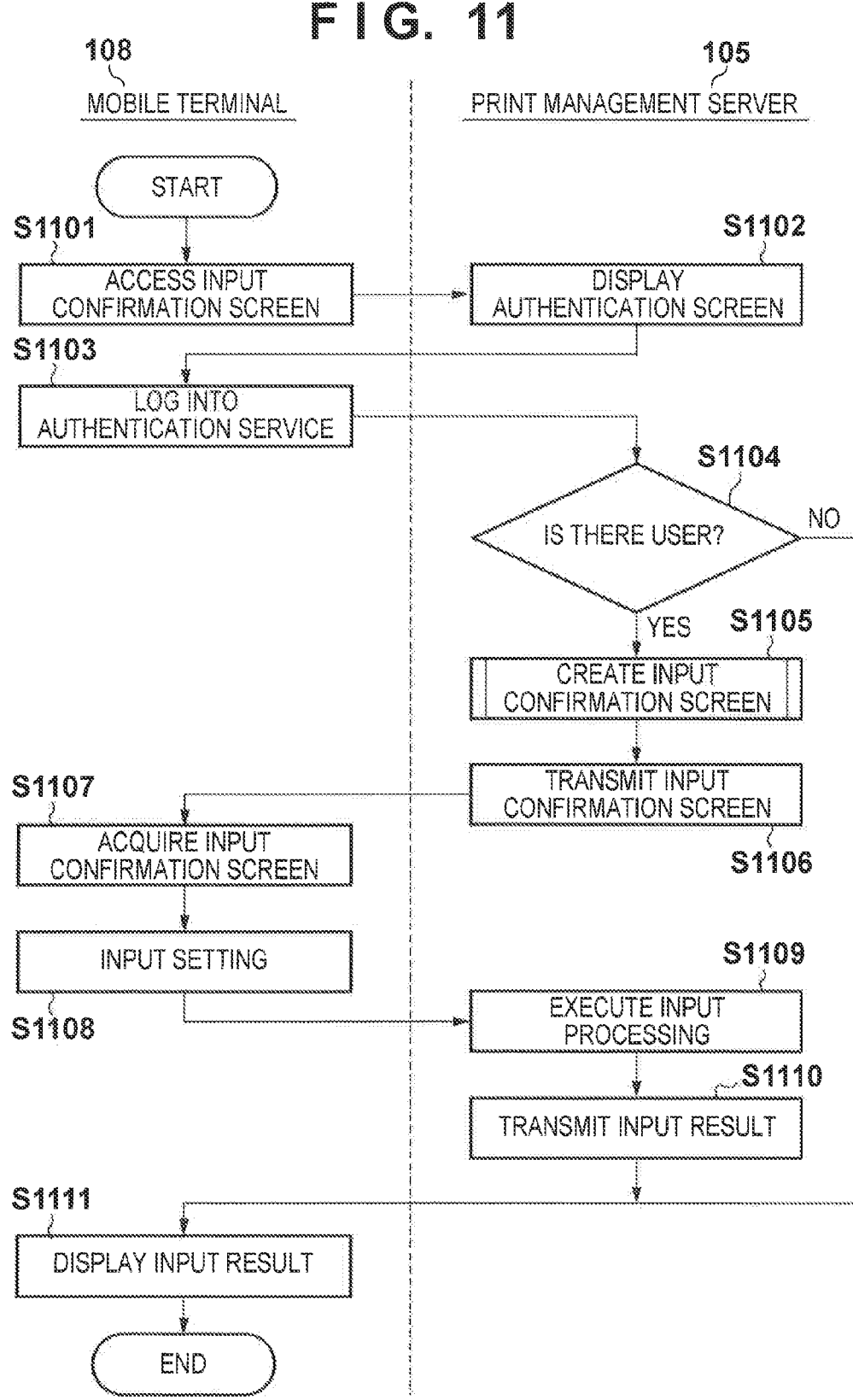

FIG. 20A

PRINT REQUEST FOR FILE "ZZZ.ZIP" HAS BEEN ACCEPTED FROM USER "XXX". "ZZZ.ZIP" IS A COMPRESSED FILE.

ACCESS THE FOLLOWING URL TO COMPLETE EXPANSION PROCESSING AND INPUT PROCESSING FOR COMPRESSED FILE. — 2002 REGISTRATION SUCCESS MESSAGE PORTION

EXPANSION CONFIRMATION PAGE URL:
http://can.com/mailprint/expand?document_code = 4r57jygqe35 — 2004 COMPRESSED FILE DOCUMENT CODE PORTION

2003 — EXPANSION CONFIRMATION PAGE URL PORTION

ERROR:
DOCUMENT REGISTRATION FAILED.
COMPRESSED FILE INCLUDES NO PRINTABLE DOCUMENT.

2006 — REGISTRATION FAILURE MESSAGE PORTION

2005

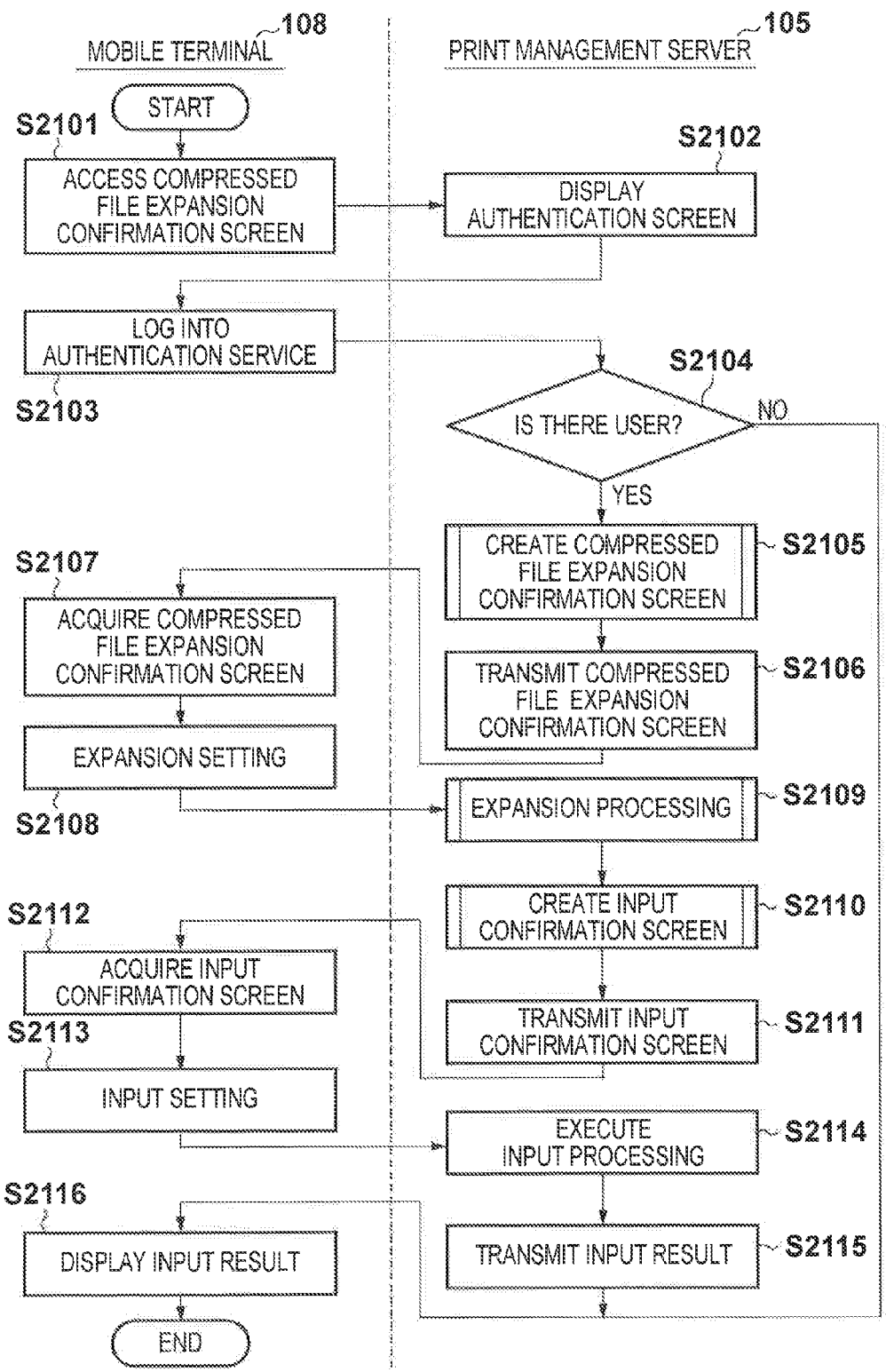

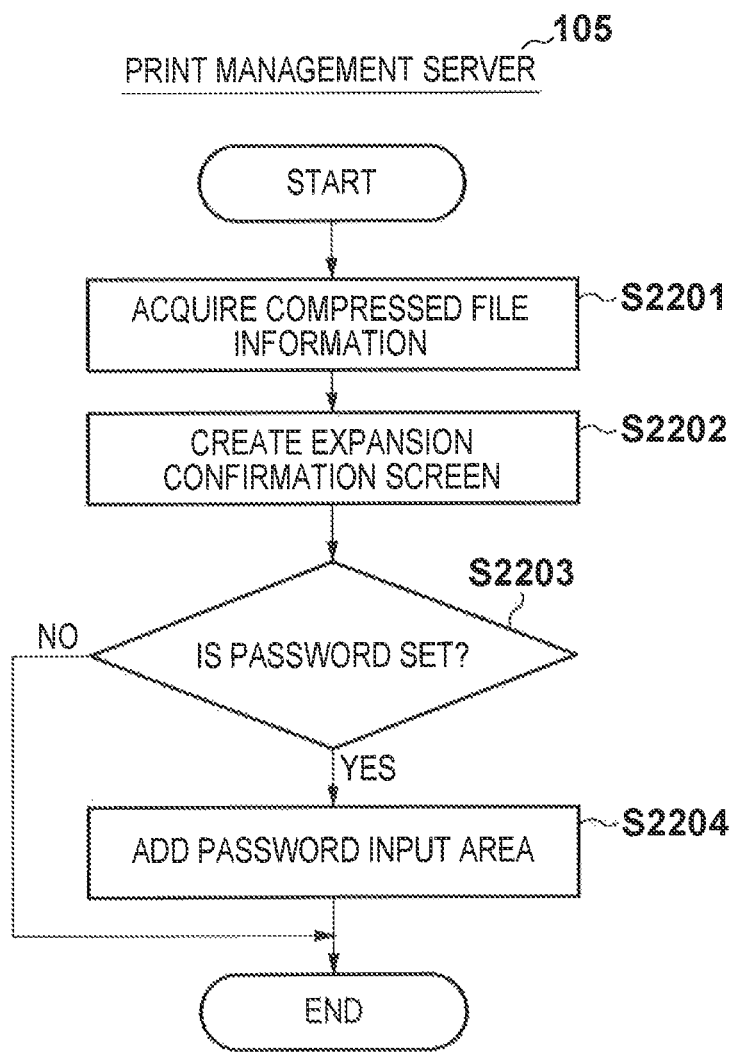

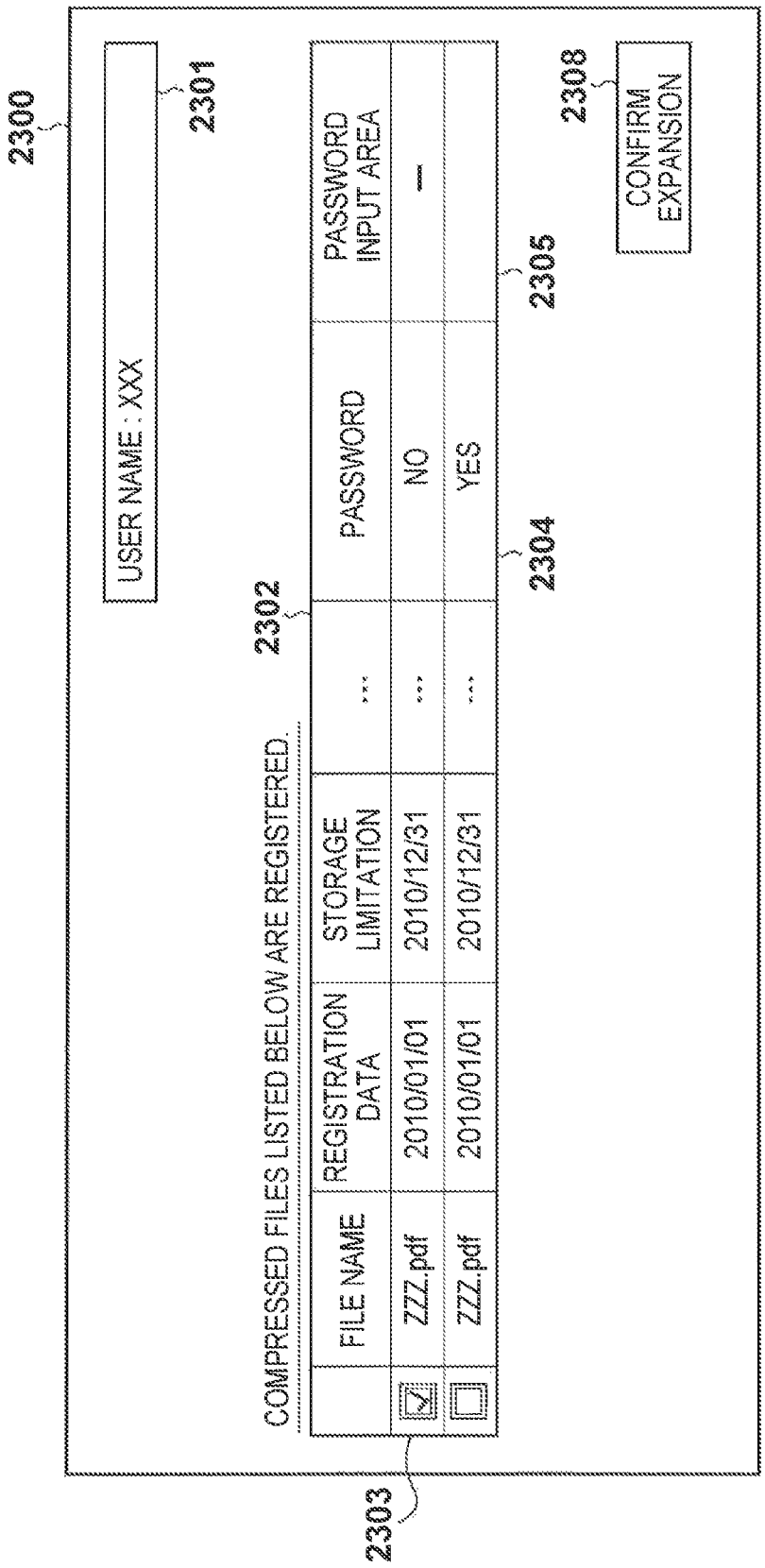

PRINTING SYSTEM, PRINTING CONTROL METHOD FOR PRINTING SYSTEM, PRINTING APPARATUS AND SERVER

BACKGROUND OF THE INVENTION

1. Field of the Invention

The present invention relates to a printing system, a printing control method for a printing system, a printing apparatus and a server, for printing a file attached to an e-mail.

2. Description of the Related Art

Conventionally, as a method of printing a document saved in a mobile terminal that does not have a printing function, a method described below is known. First, a user attaches document data to be printed that is saved in a mobile terminal to an e-mail and transmits the e-mail to a predetermined address. A print management server that has received the e-mail converts the document to print data and saves the print data. Then, the print management server controls a printing apparatus connected thereto via a network such that printing is performed with the printing apparatus based on the print data.

In the printing system as described above, Japanese Patent Laid-Open No. 2003-141021 discloses a technique in which a user inputs a document file to a server through a browser, and a print server converts the document file into a format that can be displayed in a Web browser and transmits the converted document file to the user who input the document file.

However, conventionally, when a document file is input by a user, the document file is converted into print data without the user's confirmation. Accordingly, for example, in a case where the document file is attached to a spam e-mail or the like, that file is also converted into print data.

SUMMARY OF THE INVENTION

An aspect of the present invention is to eliminate the above-mentioned problems with the conventional technology. The present invention provides a printing system, a printing control method for a printing system, a printing apparatus and a server, for confirming an intention of a user for inputting document data attached to an e-mail, before the document data is converted into print data.

The present invention in its first aspect provides a printing control method executed in a printing system comprising a terminal, a server, and a printing apparatus, the method comprising: a first transmission step of the terminal transmitting a first e-mail to which a file to be printed is attached to the server; a first reception step of the server receiving the first e-mail; a saving step of the server temporarily saving the file attached to the first e-mail; a second transmission step of the server transmitting a second e-mail for confirming a user to the terminal; a second reception step of the terminal receiving the second e-mail; a returning step of the terminal returning information on the user to the server in response to the second e-mail; an acquiring step of the server acquiring the information on the user; after the information on the user is acquired in the acquiring step, a registration step of the server converting the file temporarily saved in the saving step into a file for printing and registering the converted file in the server; and a print control step of the server transmitting the file for printing that is registered in the registration step to the printing apparatus to cause the printing apparatus to perform printing of the file.

The present invention in its second aspect provides a printing system comprising a terminal, a server and a printing apparatus, wherein the terminal comprises: a first transmission unit configured to transmit a first e-mail to which a file to be printed is attached to the server; a second reception unit configured to receive a second e-mail for confirming a user from the server; and a returning unit configured to return information on the user to the server in response to the second e-mail, and the server comprises: a first reception unit configured to receive the first e-mail from the terminal; a saving unit configured to temporarily save the file attached to the first e-mail; a second transmission unit configured to transmit the second e-mail to the terminal; an acquiring unit configured to acquire the information on the user; after the information on the user is acquired by the acquiring unit, a registration unit configured to convert the file temporarily saved by the saving unit into a file for printing and register the converted file in the server; and a print control unit configured to transmit the file for printing that is registered by the registration unit to the printing apparatus to cause the printing apparatus to perform printing of the file.

The present invention in its third aspect provides a server capable of communicating with a terminal and a printing apparatus, comprising: a first reception unit configured to receive a first e-mail to which a file to be printed is attached from the terminal; a saving unit configured to temporarily save the file attached to the first e-mail; a second transmission unit configured to transmit a second e-mail for confirming a user to the terminal; an acquiring unit configured to acquire information on the user; after the information on the user is acquired by the acquiring unit, a registration unit configured to convert the file temporarily saved by the saving unit into a file for printing and register the converted file in the server; and a print control unit configured to transmit the file for printing that is registered by the registration unit to the printing apparatus to cause the printing apparatus to perform printing of the file.

According to the present invention, it is possible to confirm an intention of a user for inputting document data attached to an e-mail before the document data is converted into print data.

Further features of the present invention will become apparent from the following description of exemplary embodiments with reference to the attached drawings.

BRIEF DESCRIPTION OF THE DRAWINGS

FIG. 9 is a diagram illustrating a procedure for processing of registering a document to be printed in the print management service.

FIGS. 10A to 10C show examples of the text of a registration confirmation e-mail.

FIG. 11 is a diagram illustrating a procedure for processing of inputting a document to be printed in the print management service.

FIGS. 20A and 20B show examples of the text of an expansion confirmation e-mail.

FIG. 21 is a diagram illustrating a procedure for processing of inputting a compressed file in the print management service.

FIG. 22 is a diagram illustrating a procedure for processing of creating a compressed file expansion confirmation screen in the print management service.

FIG. 23 shows an example of the expansion confirmation screen.

DESCRIPTION OF THE EMBODIMENTS

Figure 1:
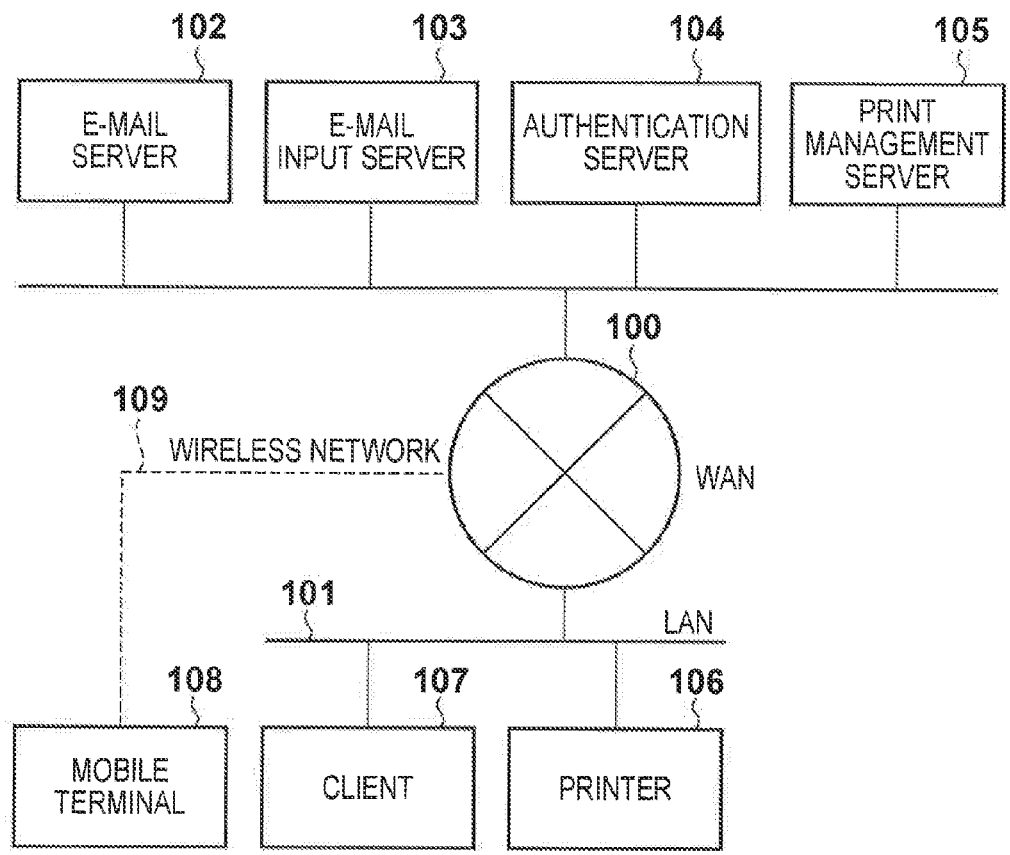
FIG. 1 is a diagram illustrating an overall system configuration.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same constituent elements are assigned the same reference numeral, and a description thereof will be omitted.

Embodiment 1

Configuration of Printing System

FIG. 1 is a diagram illustrating a configuration of a printing system according to an embodiment of the present invention. A WAN 100 is a wide area network, and in the present embodiment, a World Wide Web (hereinafter referred to as "WWW") system is constructed. A LAN 101 is a local area network connecting the constituent elements in FIG. 1. A wireless network 109 is a wireless network configured from a public line, a wireless base station, and the like, and a mobile terminal 108 is connected to the WAN 100 so as to be capable of communicating on the WWW system.

An e-mail server 102 processes an e-mail according to an e-mail transmitting/receiving request received from a client 107, a mobile terminal 108, and an e-mail input (submit) server 103 via the WAN 100 and the LAN 101. The e-mail server 102 includes at least one e-mail address, and receives and manages e-mails transmitted to that e-mail address. The e-mail server 102 can also transmit an e-mail to another e-mail address. The e-mail input server 103 regularly checks e-mails received by the e-mail server 102, and registers document data to be printed in a print management server 105 according to the content of the e-mails. An authentication server 104 performs user authentication according to a Web request received via the WWW system from a client or a request received from the servers, and performs processing according to a request for acquiring user information. The print management server 105 registers document data according to the Web request from a client or a request from the e-mail input server 103, and prints a document designated by the Web request from a client with a designated printer.

A printer 106 performs print processing on the document data received from the print management server 105. The client 107 issues Web requests to the servers via the WAN 100 and the LAN 101. Specifically, a computer provided with a Web browser for using the WWW system is used. The mobile terminal 108 includes a function of connecting to the WWW system via the wireless network 109. Specifically, mailer software for transmitting/receiving e-mails and a mobile phone provided with a Web browser or a computer used as a mobile computer are used.

Figure 2:
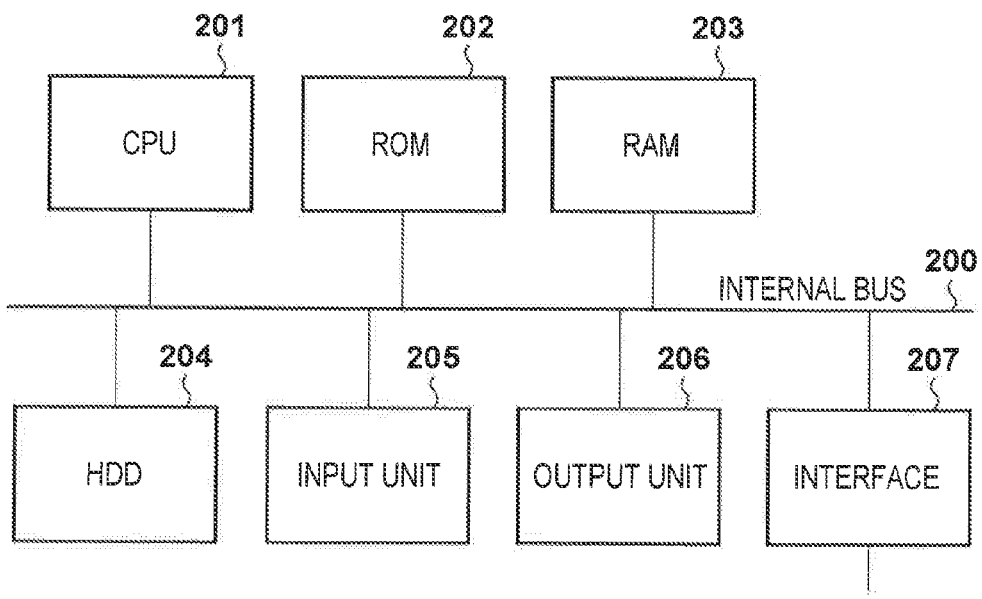
FIG. 2 is a diagram illustrating a hardware configuration of each apparatus.

FIG. 2 is a block diagram illustrating a hardware configuration of the e-mail server 102, the e-mail input server 103, the authentication server 104, the print management server 105, the client 107 and the mobile terminal 108 shown in FIG. 1. An internal bus 200 is a bus to which constituent elements such as a CPU 201, a ROM 202 and the like to be described later are connected. The CPU 201 directly or indirectly controls the constituent elements connected to each other via the internal bus 200, and executes programs for realizing operations of the present embodiment. The ROM 202 is a read-only storage unit in which a BIOS is stored. A RAM 203 is a main storage unit (direct storage unit) that is used as a work area by the CPU 201 and as temporary storage for loading software modules for realizing the present embodiment. An HDD 204 is an auxiliary storage unit (indirect storage unit) in which an OS, which is basic software and software modules are stored. An input apparatus 205 is an unshown keyboard, pointing device, or the like. An output apparatus 206 is a display or the like. The hardware can connect to the WAN 100 or the LAN 101 via an interface 207.

In the configuration shown in FIG. 2, after activation, the BIOS stored in the ROM 202 is executed by the CPU 201, and an OS is loaded from the HDD 204 to the RAM 203 so as to be executable. According to the operation of the OS, the CPU 201 loads various types of software modules described below from the HDD 204 onto the RAM 203 as necessary, so as to be executable. The various types of software modules are executed, under the control of the CPU 201, through cooperative operation by the above-described units. The interface 207 is connected to the LAN 101, controlled by the CPU 201 according to the operation of the OS, and transmits/receives requests to/from the services realized by the servers. Also, the interface 207 is connected to the WAN 100 via the LAN 101, is controlled by the CPU 201 according to the operations of the OS, and realizes WWW system communication.

E-Mail Input Service

Figure 3:
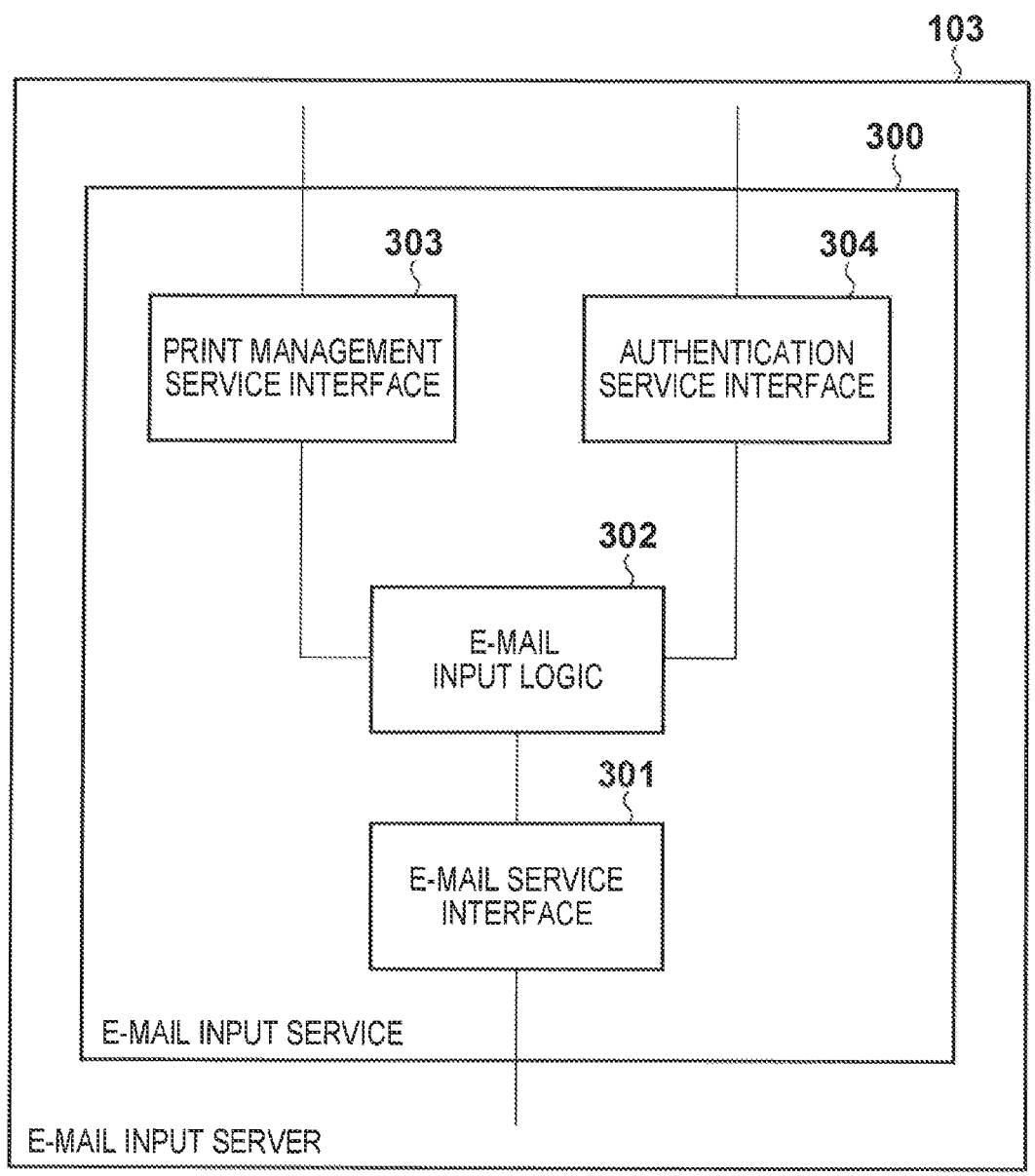
FIG. 3 is a diagram illustrating a module configuration of software that executes an e-mail input service.

FIG. 3 is a configuration diagram of software modules of an e-mail input service 300 operating on the e-mail input server 103. Each software module is stored in the HDD 204 shown in FIG. 2, and is loaded in the RAM 203 by the CPU 201 to be executed. An e-mail service interface 301 is an interface module for performing confirmation and acquisition of e-mails transmitted to the e-mail server 102, and transmission of e-mails via the e-mail server 102. A print management service interface 303 is an interface module for registering document data in a print management service 500 to be described below. An authentication service interface 304 is an interface module for requesting user authentication to or acquiring user information from an authentication service 400 to be described below.

An e-mail input logic 302 is a program module that controls whether or not to perform authentication and whether or not to register an attached document based on the contents of an e-mail. The e-mail input logic 302 performs confirmation, acquisition and transmission of an e-mail via the e-mail service interface 301. Also, the e-mail input logic 302 performs acquisition and authentication of user information via the authentication service interface 304, and performs registration of document data via the print management service interface 303, depending on the signature or contents of an e-mail. Also, when document data is registered, the e-mail input logic 302 issues a document code to be described later, and responds to the source of an e-mail via the e-mail service interface 301. In the present embodiment, the source of the e-mail is the client 107 and the mobile terminal 108 shown in FIG. 1. Hereinafter, a series of e-mail processes executed through cooperative operation of these software modules will be described as processing executed by the e-mail input service 300.

Authentication Service

Figure 4:
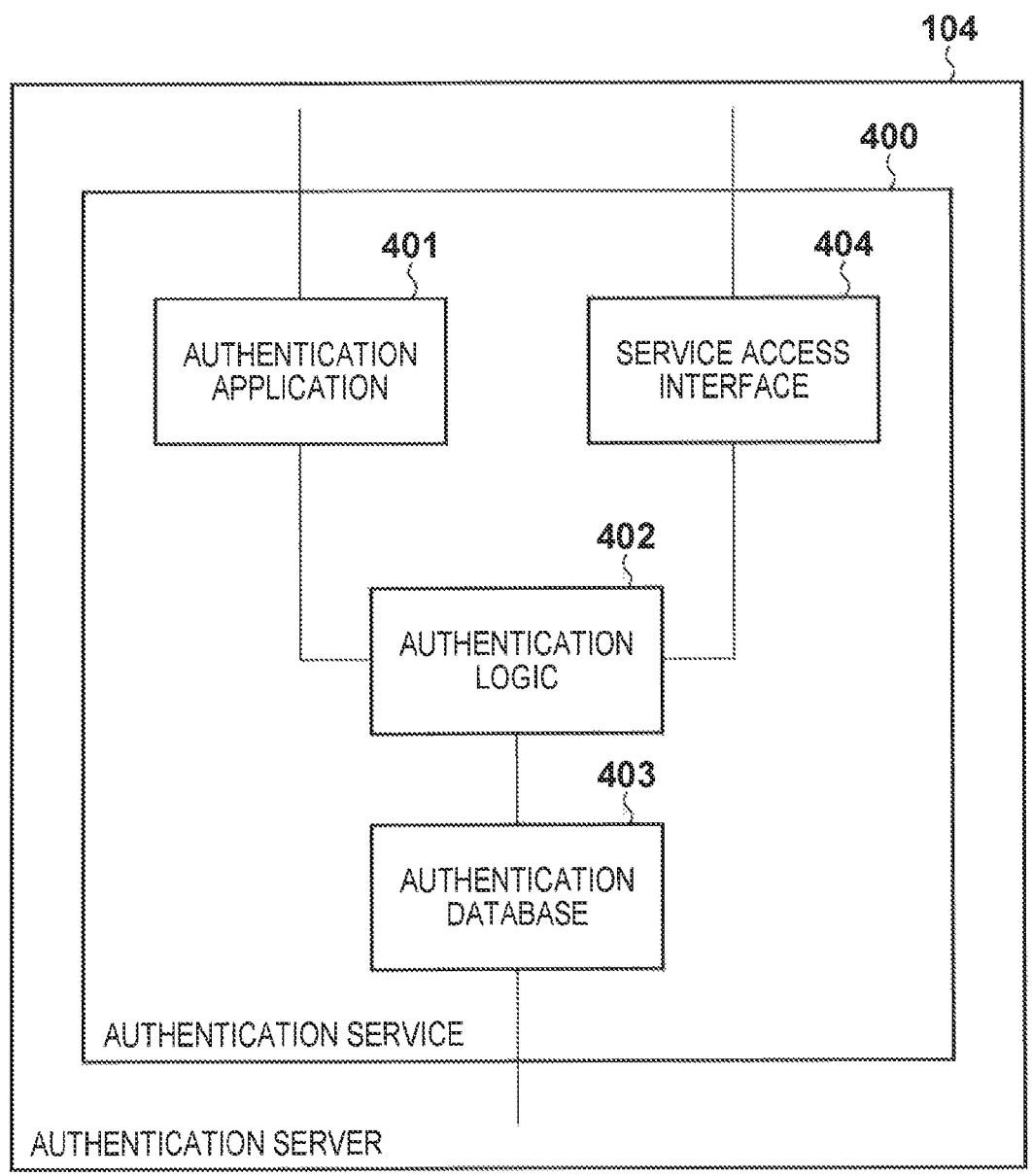
FIG. 4 is a diagram illustrating a module configuration of software that executes an authentication service.

FIG. 4 is a configuration diagram of software modules of the authentication service 400 operating on the authentication server 104. Each software module is stored in the HDD 204 shown in FIG. 2, and is loaded in the RAM 203 by the CPU 201 to be executed. An authentication application 401 includes a Web interface that accepts a Web request from the client 107 and the mobile terminal 108. The authentication application 401 responds to a Web authentication request from a Web browser provided in the client 107 and the mobile terminal 108 by creating an authentication screen (not shown). Here, in the present embodiment, as a system for performing authentication in response to a Web authentication request, a method is described in which a user ID identifying a user and a password that is confidential information are acquired, and they are matched against the user information registered in advance in an authentication database 403 to be described below. Note that the authentication system is not limited to that described above. Another system, for example, an authentication system in which a certificate contained in an accepted Web authentication request is confirmed, or an authentication method in which biological information of a user is confirmed may be used.

An authentication logic 402 is a program module that processes a Web authentication request accepted by the authentication application 401 to perform authentication processing. The authentication logic 402 performs authentication according to a preset logic. In the present embodiment, for example, the authentication database 403 is accessed, and registered user information is matched against the user information of the Web authentication request, thereby determining success/failure of authentication. The authentication logic 402 generates an authentication token if the authentication has succeeded, and responds to the client 107 or the mobile terminal 108 via the authentication application 401. A service access interface 404 is an interface module that accepts requests from other services or transmits requests to other services. Requests to be accepted include a request for acquiring user information, a request for authentication using an e-mail address registered in the user information, for example. These requests received by the service access interface 404 are processed by a logic preset in the authentication logic 402. Also, requests to be transmitted include a request for transmitting an e-mail created by the authentication logic 402. Hereinafter, a series of authentication processes executed through cooperative operation of the above-described software modules is assumed to be processing executed in the authentication service 400.

Print Management Service

Figure 5:
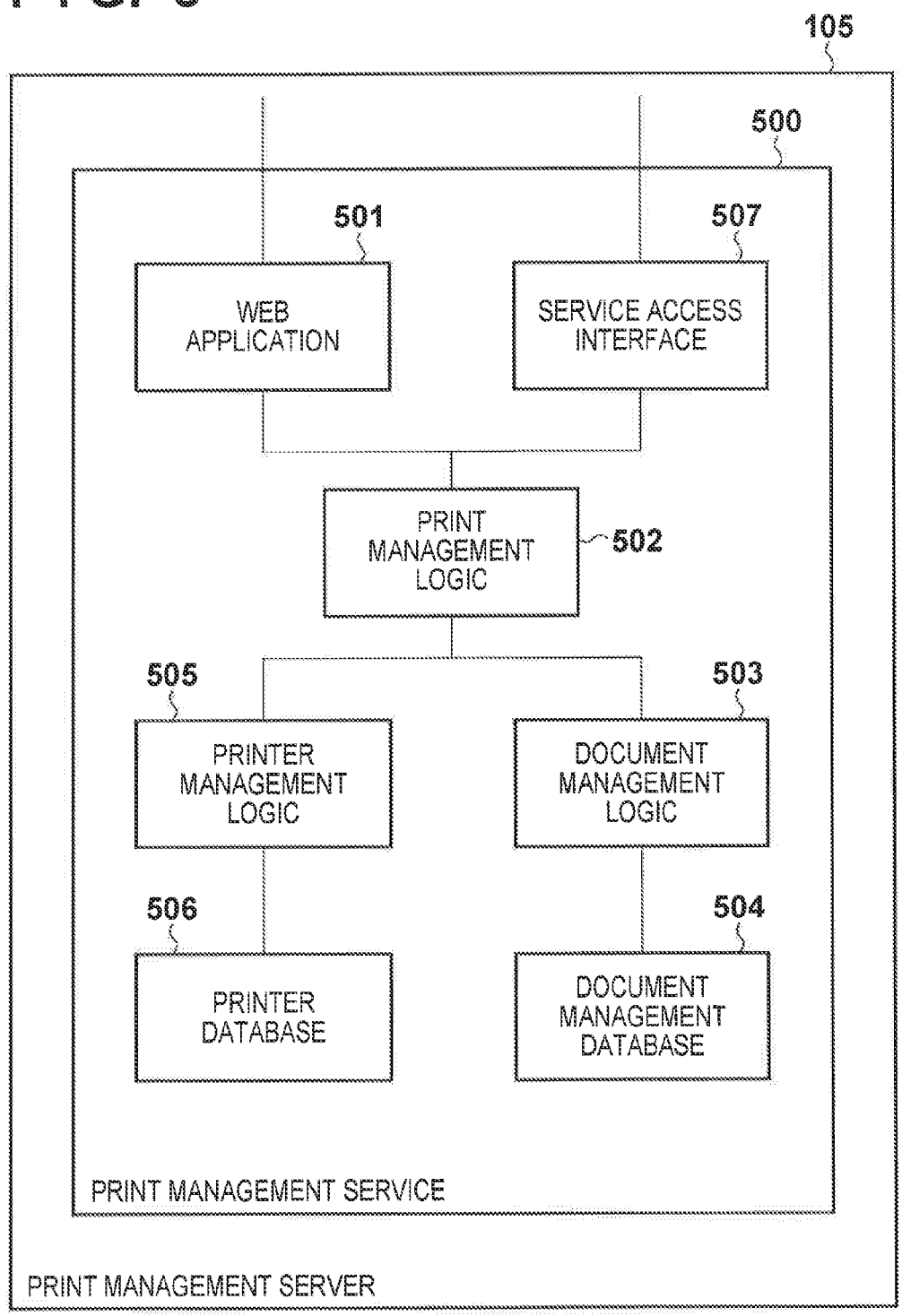
FIG. 5 is a diagram illustrating a module configuration of software that executes a print management service.

FIG. 5 is a configuration diagram of software modules of the print management service 500 operating on the print management server 105. Each software module is stored in the HDD 204 shown in FIG. 2, and is loaded in the RAM 203 by the CPU 201 to be executed.

A Web application 501 is an application including a Web interface that accepts a Web access from the client 107 and the mobile terminal 108. The Web application 501 responds to a Web request from a Web browser provided in the client 107 and the mobile terminal 108 by creating a screen of the list of documents registered by a user and the like. These screens will be described later.

In addition, the Web application 501 acquires printer information by transmitting user information to a print management logic 502 when creating the screens stated above. A printer management logic 505 acquires printer information managed by a printer database 506. A document management logic 503 acquires document information managed by a document management database 504. The document management logic 503 searches the document information using the user information received from the document management database 504 and a document code to be described below as keys.

A print request accepted by the Web application 501 is processed by the print management logic 502, and print processing is executed. Print processing to be executed includes print processing performed by providing a pull print instruction to a designated printer via a Web browser of the client 107 or the mobile terminal 108 and print processing performed by the user directly providing a pull print instruction via an input apparatus of the designated printer. The printer transmits a Web request to the print management service according to the pull print instruction, acquires document data, and executes printing.

A service access interface 507 is an interface module that accepts a request from other services. Requests to be accepted include a document registration request for accepting registration of a document. The requests received by the service access interface 507 are processed in a processing procedure preset in the print management logic 502. Hereinafter, a series of print management processes executed through cooperative operation of the above-described software modules is assumed to be processing executed by the print management service 500.

User Information Managed in Authentication Server

Figure 6:
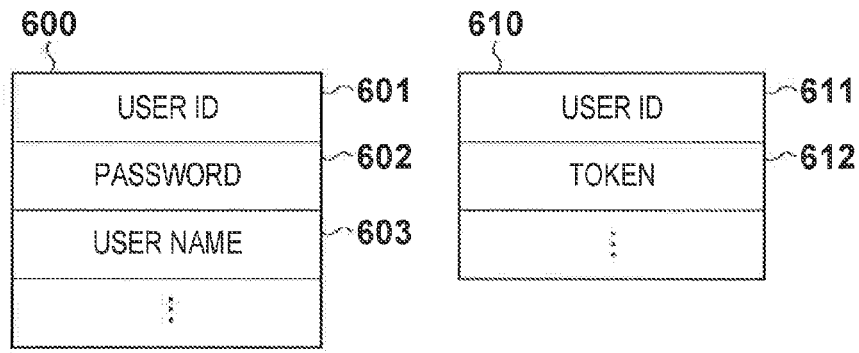
FIG. 6 shows an example of a data structure of user information.

FIG. 6 shows an example of user information managed by the authentication database 403 shown in FIG. 4. User information 600 includes a user ID 601 for uniquely identifying a user on the database, a password 602 that is confidential information, a user name 603 that is a display name of the user, and an e-mail address 604 of the user. User token information 610 includes a user ID 611 for uniquely identifying a user on the database, and an authentication token 612 indicating that the user has been authenticated. The user ID 601 and the user ID 611 of the same user will indicate the same value.

Document Information Managed by Print Management Server

Figure 7:
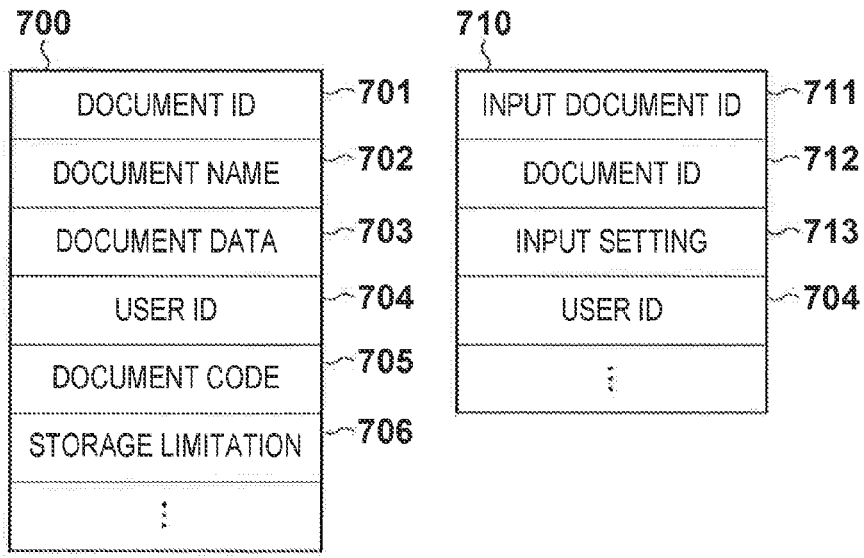
FIG. 7 shows an example of a data structure of document information.

FIG. 7 shows an example of document information managed by the document management database 504 shown in FIG. 5. Document information 700 includes a document ID 701 for uniquely identifying a document on the database, a document name 702 that is a display name of the document, document data 703 storing the binary of the document data, a user ID 704 of the user who has registered the document, a document code 705 for identifying the document data at the time of input confirmation, which will be described later, and a storage limitation 706 of the document. Here, as the document data 703, the binary of the document data may be stored directly in the document management database 504, or instead, the binary of the document may be stored in a different region (not shown) on the document management database 504, and information indicating the storage location may be stored. Also, the document information 700 is managed by the document management database 504 such that search can be performed using the document ID 701, the user ID 704 and the document code 705 as the keys. Input information 710 includes an input document ID 711 for uniquely identifying input information on the database, a document ID 712 for uniquely identifying a document for which input confirmation has been performed, an input setting 713 storing input setting, and the user ID for uniquely identifying a user who has performed input confirmation.

The processing procedure for each service in the present embodiment will be described below using flowcharts. Note that in the following description, a description of communication between the services is provided assuming the use of the mobile terminal 108. Note that in the system configuration in the present embodiment, the terminal that communicates with each service may be the client 107, as shown in FIG. 1.

Overall Processing Between Mobile Terminal and E-Mail Input Server

Figure 8:
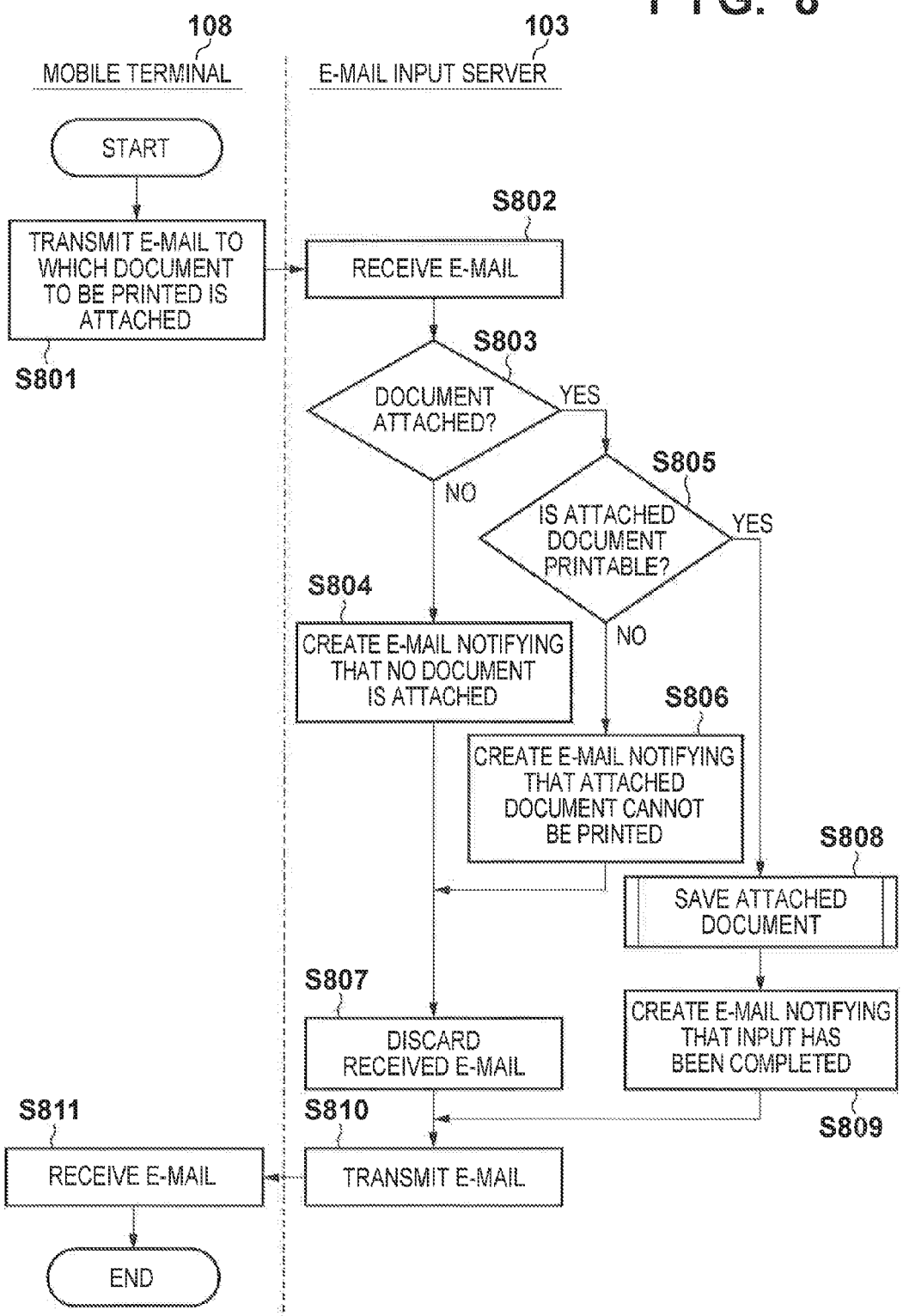
FIG. 8 is a diagram illustrating a procedure for processing of transferring a document to be printed in the e-mail input service.

FIG. 8 is a diagram illustrating a procedure for print control processing performed when the e-mail input service 300 has acquired an e-mail to which document data to be printed is attached from the mobile terminal 108. In step S801, the mobile terminal 108 transmits an e-mail (first e-mail) to which document data to be printed is attached to the e-mail server 102. In step S802, the e-mail input service 300 inquires to the e-mail server 102 about whether an e-mail has been newly at a predetermined interval. Here, in the case where there is an e-mail newly received, the e-mail input service 300 acquires the newly-received e-mail from the e-mail server 102.

In step S803, the e-mail input service 300 determines whether document data is attached to the e-mail acquired from the e-mail server 102. Here, if it has been determined that no document is attached to the e-mail acquired from the e-mail server 102, in step S804, the e-mail input service 300 creates an e-mail that includes a text notifying that no document data is attached to the e-mail. Next, in step S807, the e-mail input service 300 discards the acquired e-mail. Finally, in step S810, the e-mail input service 300 transmits the e-mail created in step S804 to the e-mail server 102.

On the other hand, if it has been determined that document data is attached to the e-mail acquired from the e-mail server 102, in step S805, the e-mail input service 300 determines whether the document data attached to the e-mail is in a format printable with the print management service 500. The document data in a printable format refers to, for example, document data in formats represented by the PDF (Portable Document Format) format of Adobe Systems Incorporated, the DOC (Microsoft Word) format of Microsoft, and the like, and formats represented by JPEG (Joint Photographic Experts Group) format and the like that are printable with a printer.

Here, if it has been determined that the document data attached to the e-mail is not document data in a printable format, in step S806, the e-mail input service 300 creates an e-mail that includes a text notifying that the attached document is not in a printable format. Next, in step S807, the e-mail input service 300 discards the acquired e-mail. Finally, in step S810, the e-mail input service 300 transmits the e-mail created in step S804 to the e-mail server 102. On the other hand, if it has been determined that the document attached to the e-mail is in a printable format, in step S808, the e-mail input service 300 temporarily registers the attached document data in the print management service 500.

Registration Processing of Document Data

FIG. 9 is a flowchart illustrating a processing procedure performed when the e-mail input service 300 registers document data attached to an e-mail in the print management service 500 in step S808 in FIG. 8. In step S901, the e-mail input service 300 acquires the source e-mail address of the e-mail acquired in step S802. In step S902, the e-mail input service 300 logs into the authentication service 400 using the source e-mail address acquired in step S901. In step S903, the authentication service 400 searches the user information 600 managed by the authentication database 403 using the source e-mail address acquired by the e-mail input service 300, and determines whether there is a user corresponding thereto.

Here, if it has been determined that there is no user corresponding to the source e-mail address in the authentication database 403, in step S910, the e-mail input service 300 receives, from the authentication service 400, an authentication failure result instead of a registration result. In contrast, if it has been determined that there is a user corresponding to the source e-mail address in the authentication database 403, in step S904, the authentication service 400 acquires an authentication token corresponding to the user from the user token information 610, and transmits the authentication token to the e-mail input service 300.

In step S905, the e-mail input service 300 acquires, as an authentication success result, the authentication token from the authentication service 400. In step S906, the e-mail input service 300 transmits the document data attached to the e-mail to the print management service 500 with the authentication token acquired in step S905. In step S907, the print management service 500 registers the document data received from the e-mail input service 300 in the document management database 504. The print management service 500 identifies the user information 600 from the authentication database 403 using the authentication token that has been received from the e-mail input service 300 with the document data. The print management service 500 interprets that the user corresponding to the identified user information 600 as the user that has been authenticated when the document data was registered, and registers the user ID and the document data in association with each other in the document management database 504. When the document data is registered, the print management service 500 issues the document ID 701 identifying the document data, and acquires the document name 702 from the document data.

In step S908, the print management service 500 generates the document code 705 corresponding to the document ID

701. The document code 705 is, similar to the document ID 701, a unique value used for searching the document data managed by the document management database 504, and is used as a URL parameter for the mobile terminal 108 to display an input confirmation screen to be described below. As a method of generating the document code 705, a method of concatenating, in the document information 700, the document ID 701 with at least one document information element, a method of concatenating the document ID 701 with a hash value of the document data 703, or the like may be used, and there is no limitation to the generation method. In step S909, the print management service 500 transmits the document code 705 generated in step S908 to the e-mail input service 300 with the registration success result. In step S910, the e-mail input service 300 acquires the registration result from the print management service 500.

In the processing shown in FIG. 9, if registration of the document data in the print management service 500 has succeeded, in step S809 in FIG. 8, the e-mail input service 300 creates an e-mail (second e-mail) that includes a text notifying that input has been completed. Here, the e-mail input service 300 generates a URL to an input confirmation screen (to be described below) having the document code 705 acquired in step S910 as a URL parameter, and indicates the URL as a hyperlink destination in the text of the e-mail. In step S810, the e-mail input service 300 transmits the e-mail created in step S804, S806 or S809 to the mobile terminal 108 via the e-mail server 102, as a result of registration processing performed on the document data attached to the e-mail acquire in step S802. In step S811, the mobile terminal 108 inquires to the e-mail server 102 about whether an e-mail has been newly received at a predetermined interval, and receives the e-mail transmitted by the e-mail input service 300 in step S810.

FIGS. 10A to 10C show examples of the texts of e-mails created in steps S804, S806 and S809. A text 1001 shown in FIG. 10A illustrates the text of the e-mail that the e-mail input service 300 creates in step S809 when registration has succeeded. A text 1002 shown in FIG. 10B illustrates the text of the e-mail that the e-mail input service 300 creates in step S804 when no document data to be registered is attached. A text 1003 shown in FIG. 10C illustrates the text of the e-mail that the e-mail input service 300 creates in step S806 when the attached document is in a format that cannot be printed. As described above, in the present embodiment, in the e-mail input service 300, document data attached to an e-mail can be registered in the print management service 500 as a document to be printed.

Confirmation of Input

FIG. 11 is a flowchart illustrating a procedure for processing of confirming, at the mobile terminal 108, input of a document that has been registered in the print management service 500 through the processing illustrated in FIG. 8. In step S1101, the mobile terminal 108 accesses an input confirmation screen URL (Web page) described in the input confirmation e-mail 1001 received in step S811 using a Web browser provided therein. When the print management service 500 has accepted access through the Web (Web access) to the input confirmation screen from the mobile terminal 108, in step S1102, the print management service 500 redirects the Web access from the mobile terminal 108 to an authentication screen (not shown) created by the authentication service 400. In step S1103, the mobile terminal 108 executes a Web access from the Web page, the Web access including a user ID and a password as authentication information, and thereby logs into the authentication service 400.

In step S1104, the authentication service 400 searches the authentication database 403 and determines whether a user corresponding to the user ID and the password accepted from the mobile terminal 108 is present.

Here, if it has been determined that there is no user who corresponds to the user ID and the password accepted from the mobile terminal 108, in step S1111, the authentication service 400 transmits an authentication failure screen (not shown) notifying a login failure to the mobile terminal 108, and ends this processing. In contrast, if it has been determined that there is a user who corresponds to the user ID and the password accepted from the mobile terminal 108, the authentication service 400 transmits an authentication token of that user to the print management service 500, and thereby notifies that the user has been logged in. In step S1105, the print management service 500 creates an input confirmation screen associated with the authenticated user.

Figure 12:
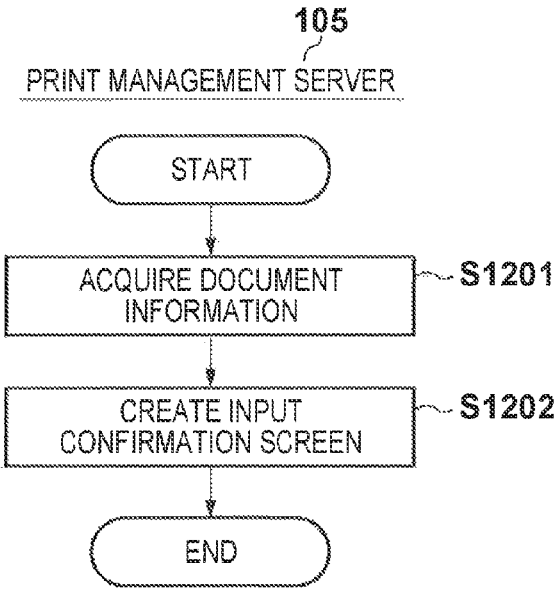
FIG. 12 is a diagram illustrating a procedure for processing of creating an input confirmation screen in the print management service.

FIG. 12 is a flowchart illustrating a procedure for processing of the print management service 500, in step S1105, creating the input confirmation screen for document data associated with an authenticated user. In step S1201, the print management service 500 searches the document management database 504 for document information corresponding to the user ID of the authenticated user, thereby acquiring the document information. In step S1202, the print management service 500 creates an input confirmation screen using the document information acquired in step S1201.

Figure 13:
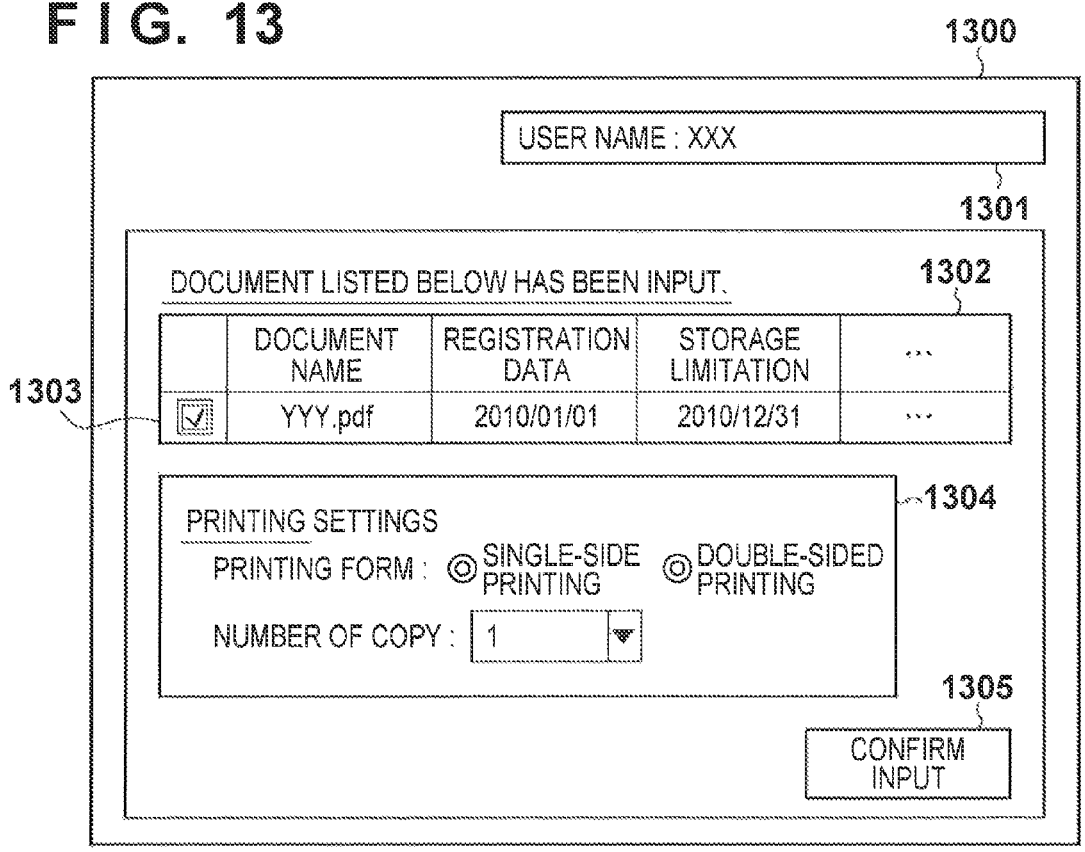
FIG. 13 is a diagram illustrating an example of the input confirmation screen.

FIG. 13 shows an example of the input confirmation screen created by the print management service 500 in step S1202. An input confirmation screen 1300 is configured to include a user name display label 1301, a document information list 1302, an input document selection check box 1303, a print setting area 1304, and an input confirmation button 1305. The user name display label 1301 displays the user name of an authenticated user, from among the user information managed by the authentication database 403. The document information list 1302 displays each item of the document information associated with the authenticated user, from among the document information managed by the document management database 504. The input document selection check box 1303 is used when designating a document whose input is to be confirmed. The print setting area 1304 is used when performing print settings of the document whose input is to be confirmed. Although in the print setting area 1304 shown in FIG. 13, the print mode and the number of copies can be set, setting items may be different depending on the capability of the printer used for printing. The input confirmation button 1305 is pressed when input of the document selected by the input document selection check box 1303 is confirmed. That is, with the input confirmation button, it is possible to return the intention of the user to confirm input to the print management server 105. With the pressing of the input confirmation button 1305 serving as a trigger, the print management service 500 generates the input information 710 using the document information designated by the input document selection check box 1303 and the print settings set in the print setting area 1304, and manages the resultant data in the document management database 504.

FIG. 11 is referred to again. In step S1106, the print management service 500 transmits the input confirmation screen created in step S1105 to the mobile terminal 108. In step S1107, the mobile terminal 108 acquires the input confirmation screen from the print management service 500, and displays the screen on the Web browser provided therein. In step S1108, the mobile terminal 108 selects a document to be input and performs print settings through the Web browser provided therein, and transmits a Web access to the print management service 500. In step S1109, when the print management service 500 has accepted the Web access including the designation of document data to be input and print settings from the mobile terminal 108, the print management service 500 generates input information 710 using the corresponding document information and print settings, and saves the input information 710 in the document management database 504. In step S1110, the print management service 500 transmits the result of input processing to the mobile terminal 108. In step S1111, upon receiving the input processing result from the print management service 500 that has been transmitted in step S1110, the mobile terminal 108 displays the result on the Web browser provided therein, and ends this processing.

With the procedure described above, the processing of inputting a document to be printed can be completed in the print management service 500. That is, instead of the print management service 500 completing the input processing when the processing shown in FIG. 8 is performed, by expressly prompting the user who has transmitted the e-mail with the document attached to perform an input confirming operation in the processing illustrated in FIG. 11, it is possible to avoid input via a fraudulent e-mail with a document attached such as a spam e-mail.

Printing of Document

Figure 14:
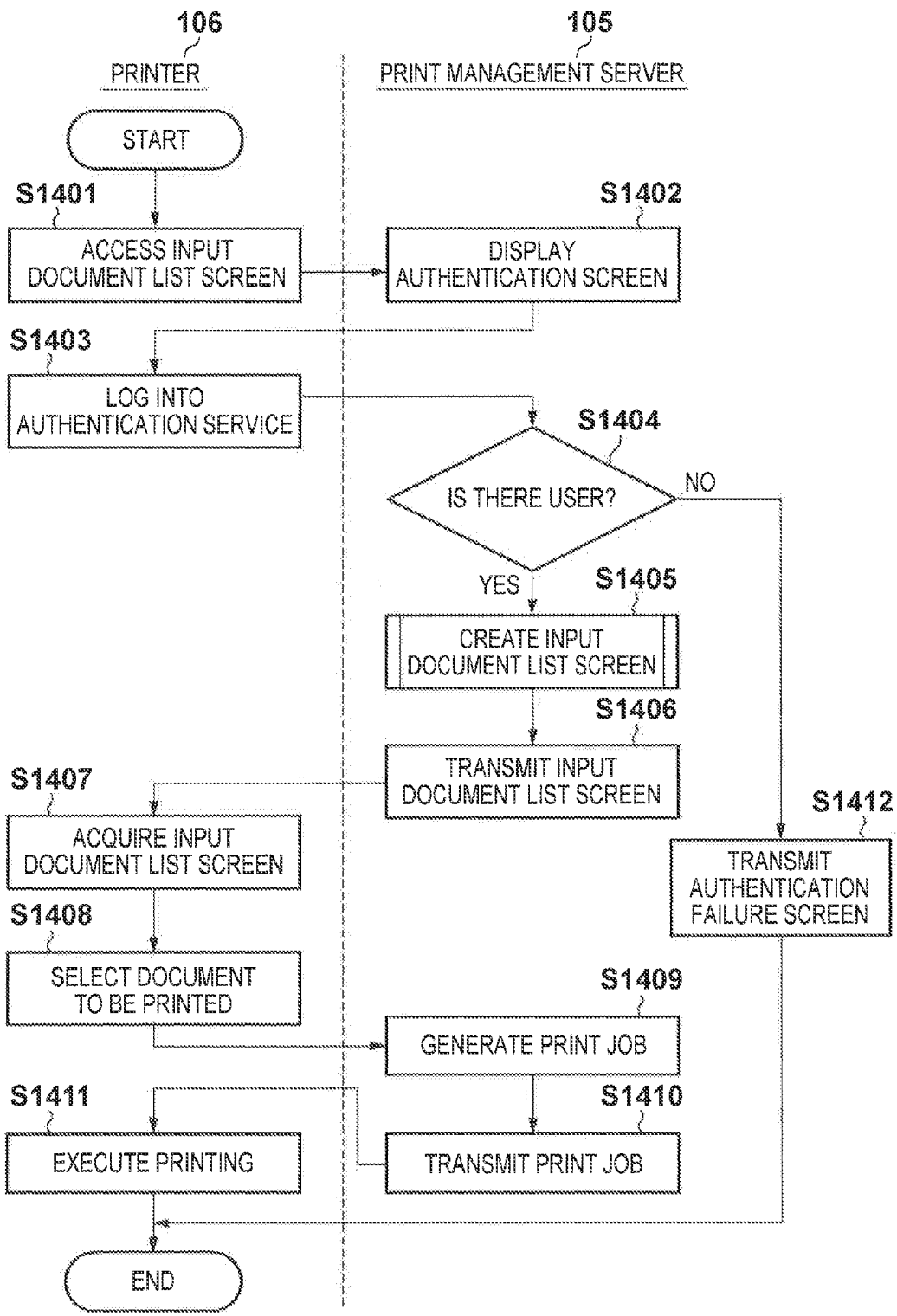
FIG. 14 is a diagram illustrating a procedure for print processing in the print management service.

FIG. 14 is a flowchart illustrating a procedure for processing of printing, with the printer 106, a document whose input has been confirmed in the print management service 500 through the processing illustrated in FIG. 11. In step S1401, the printer 106 loads a pull print application into the RAM 203 so as to be executable from the HDD 204 provided therein. Then, the printer 106 transmits a Web request for requesting the print management service 500 for the input document list screen via the pull print application. In step S1402, when the print management service 500 has accepted the Web request for acquiring the input document list screen from the pull print application that operates on the printer 106, the print management service 500 transmits the authentication screen (not shown) created by the authentication service 400. In step S1403, the printer 106 logs into the authentication service 400 by transmitting a Web request including a user ID and a password as authentication information via the pull print application.

In step S1404, the authentication service 400 searches the authentication database 403 and determines whether there is a user corresponding to the user ID and the password accepted from the printer 106. Here, if it has been determined that there is no user who corresponds to the user ID and the password accepted from the printer 106, in step S1412, the authentication service 400 transmits an authentication failure screen (not shown) notifying a login failure to the printer 106, and ends this processing. In contrast, if it has been determined that there is a user who corresponds to the user ID and the password accepted from the printer 106, the authentication service 400 transmits an authentication token of that user to the print management service 500, and thereby notifies that the user has been logged in. In step S1405, the print management service 500 creates an input document list screen associated with the authenticated user.

Figure 15:
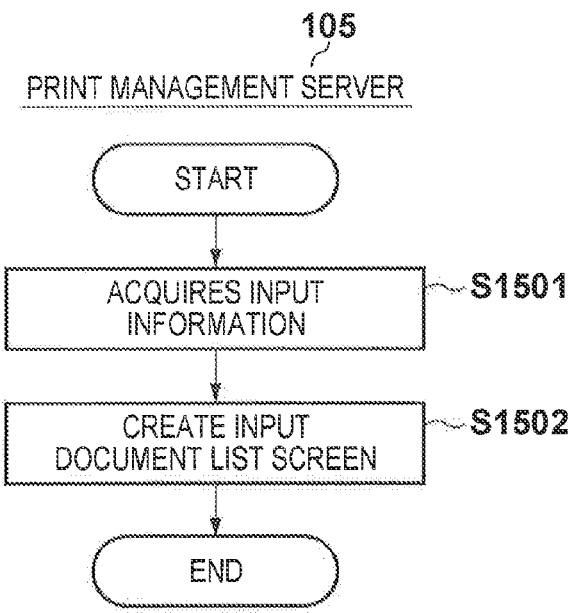
FIG. 15 is a diagram illustrating a procedure for processing of creating an input document list screen in the print management service.

FIG. 15 is a flowchart illustrating a procedure for processing of the print management service 500 creating, in step S1405, the input document list screen of document data associated with an authenticated user. In step S1501, the print management service 500 searches the document management database 504 for input information corresponding to the user ID of an authenticated user, thereby acquiring the input information. In step S1502, the print management service 500 creates an input confirmation screen using the input information acquired in step S1501.

Figure 16:
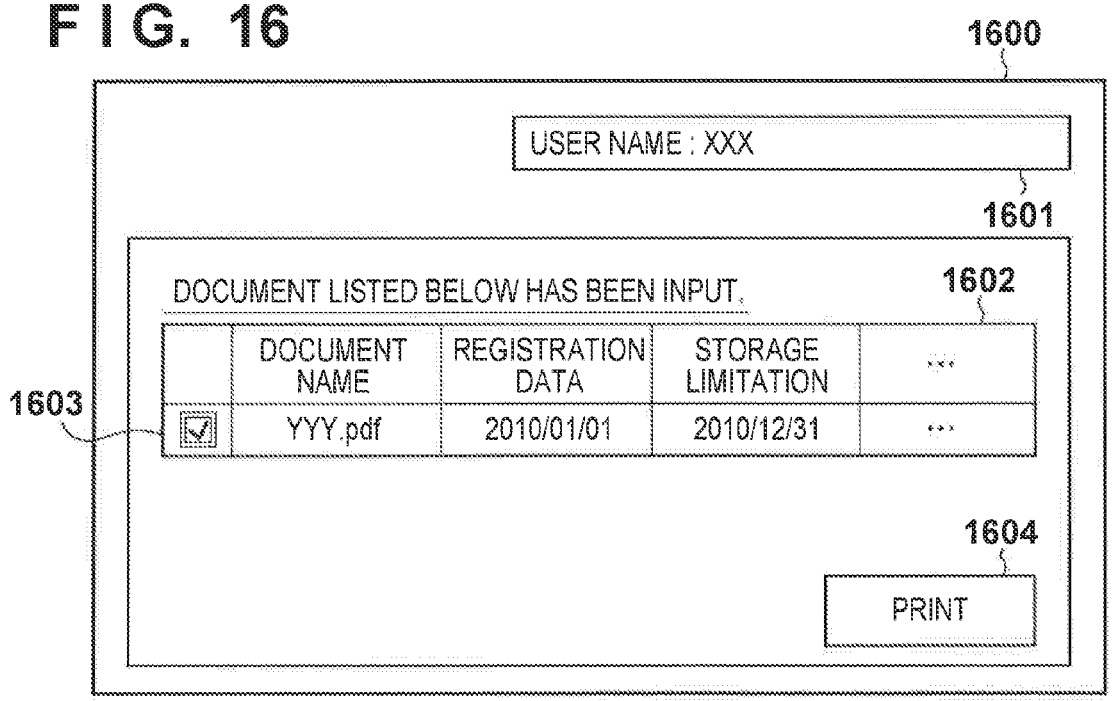
FIG. 16 shows an example of the input document list screen.

FIG. 16 shows an example of the input document list screen created by the print management service 500 in step S1502. An input document list screen 1600 is configured to include a user name display label 1601, an input document list 1602, a print document selection check box 1603, and a print button 1604. The user name display label 1601 displays the user name of an authenticated user, from among the user information managed by the authentication database 403. The input document list 1602 displays, from among the document information managed by the document management database 504, each item of the input information and the document information associated with the authenticated user. The print document selection check box 1603 is used when designating an input document to be printed. The print button 1604 is pressed when printing the document selected by the print document selection check box 1603. With the pressing of the print button 1604 serving as a trigger, the print management service 500 converts the document designated by the print document selection check box 1603 into a print job.

FIG. 14 is referred to again. In step S1406, the print management service 500 transmits the input confirmation screen created in step S1405 to the printer 106. In step S1407, the printer 106 acquires the input document list screen from the print management service 500, and displays the screen with the pull print application provided therein. In step S1408, the printer 106 selects a document to be printed via the pull print application provided therein, and transmits a Web request to the print management service 500. In step S1409, when the print management service 500 has accepted the Web request including the designation of a document to be printed from the printer 106, the print management service 500 generates a print job using the corresponding input information and document data. In step S1410, the print management service 500 transmits the print job to the printer 106. In step S1411, upon receiving the print job from the management service 500 that has been transmitted in step S1410, the printer 106 starts printing. With the processing described above, it is possible to print document data attached to the e-mail input to the e-mail input service 300 in the processing illustrated in FIG. 8 with a designated printer.

According to the present embodiment, the document data attached to an e-mail received from the user can be printed with a predetermined printer. Also, it is possible to print a document without requiring the client 107 and the mobile terminal 108 to have additional software such as driver software for printing.

Embodiment 2

In Embodiment 1, a case was described in which a document attached to an e-mail transmitted from the mobile terminal 108 to the e-mail input service 300 is printed with a predetermined printer via the print management service 500. In Embodiment 2, a case is described in which when a document attached to an e-mail transmitted from the mobile terminal 108 to the e-mail input service 300 is a file in a compression format (hereinafter referred to as the "compressed file") including a plurality of documents, the document is printed with a predetermined printer via the print management service 500.

In the description provided below, the processing procedure for each service of the present embodiment will be described using flowcharts. Note that in the description provided below, description of communication with each service will be provided assuming the use of the mobile terminal 108. Note that in the system configuration of the present embodiment, as shown in FIG. 1, the client 107 may be used as the terminal to perform communication with each service.

Overall Processing Between Mobile Terminal and E-Mail Input Server

Figure 17:
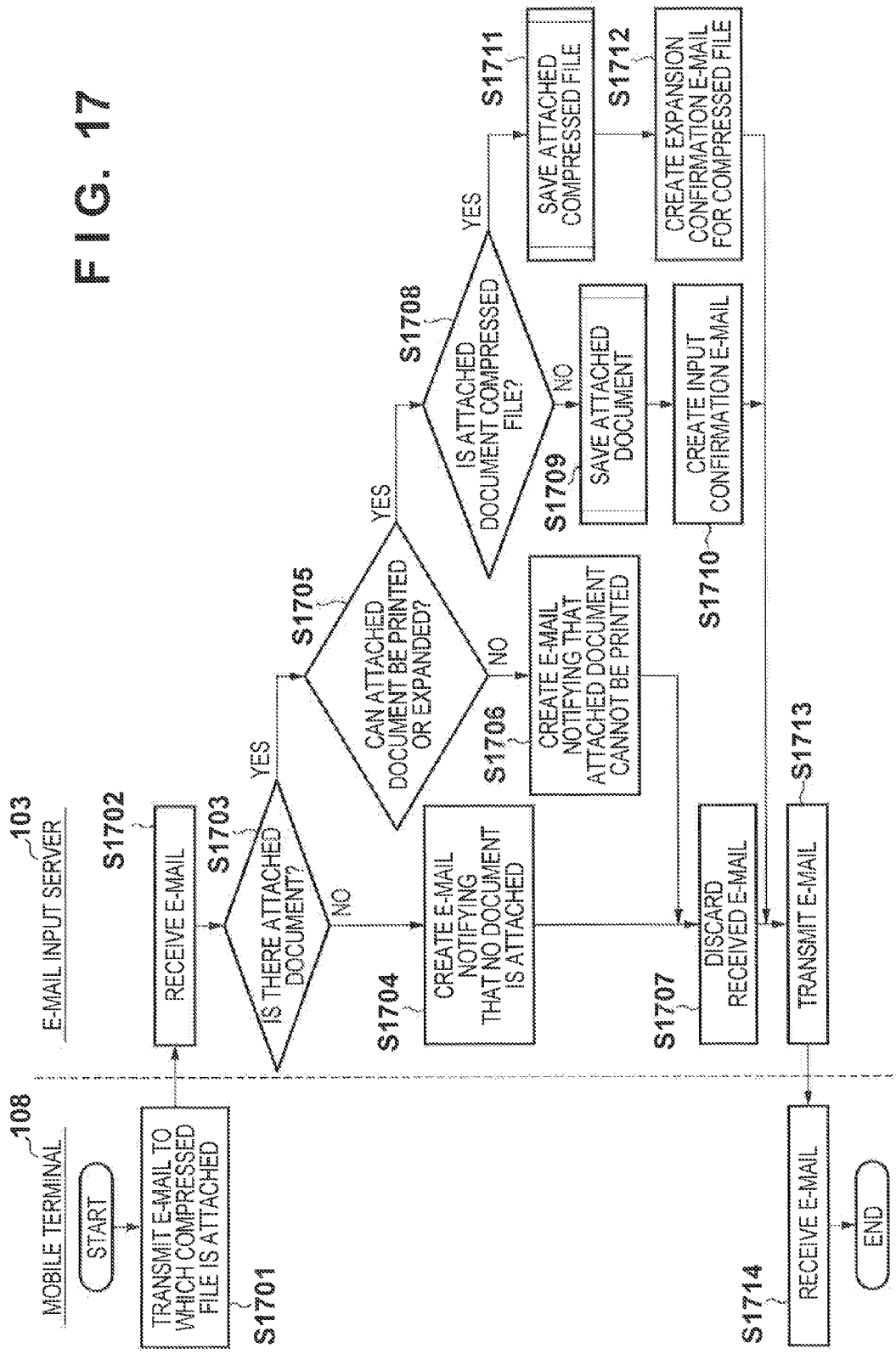
FIG. 17 is a diagram illustrating a procedure for processing of transferring a compressed file in the e-mail input service.

FIG. 17 is a flowchart illustrating a procedure for processing performed when the e-mail input service 300 has acquired an e-mail with a file attached from the mobile terminal 108. In step S1701, the mobile terminal 108 transmits an e-mail with a file attached to the e-mail server 102. At this time, the file attached to the e-mail is assumed to be either a document data or a compressed file. In step S1702, the e-mail input service 300 inquires to the e-mail server 102 about whether an e-mail has been newly received at a predetermined interval. In the case where there is an e-mail newly received, the e-mail input service 300 acquires the newly-received e-mail from the e-mail server 102. In step S1703, the e-mail input service 300 determines whether a file is attached to the e-mail acquired from the e-mail server 102.

If it has been determined that a file is not attached to the e-mail acquired from the e-mail server 102, in step S1704, the e-mail input service 300 creates an e-mail that includes a text notifying that no file is attached to the e-mail. In step S1707, the e-mail input service 300 discards the acquired e-mail. In step S1713, the e-mail input service 300 transmits the e-mail created in step S1704 to the e-mail server 102.

On the other hand, if it has been determined that a file is attached to the e-mail acquired from the e-mail server 102, in step S1705, the e-mail input service 300 determines whether the file attached to the e-mail is document data in a format printable with the print management service 500, or a compressed file in a format that can be expanded. The format of a compressed file that can be expanded refers to, for example, the ZIP format. Printable formats are the same as those described in Embodiment 1.

If it has been determined that the document attached to the e-mail is not document data in a printable format or a compressed file in a format that can be expanded, in step S1706, the e-mail input service 300 creates an e-mail that includes a text notifying that the attached file is not in a printable format or in a format that can be expanded. Next, in step S1707, the e-mail input service 300 discards the acquired e-mail. In step S1713, the e-mail input service 300 transmits the e-mail created in step S1706 to the e-mail server 102.

On the other hand, if it has been determined that the document attached to the e-mail is document data in a printable format or in a format that can be expanded, in step S1708, the e-mail input service 300 confirms the type of the file attached to the e-mail, and determines whether the file is a compressed file.

Here, if it has been determined that the file attached to the e-mail is document data other than a compressed file, in step S1709, the e-mail input service 300 temporarily registers the attached document in the print management service 500. The processing performed in step S1709 is the same as that performed in step S808 in Embodiment 1. If the document has been successfully registered in the print management service 500 in step S1709, in step S1710, the e-mail input service 300 creates an e-mail notifying that input has been completed. The processing performed in step S1710 is the same as that performed in step S809 in Embodiment 1. In contrast, if it has been determined that the file attached to the e-mail is a compressed file, in step S1711, the e-mail input service temporarily registers the attached compressed file in the print management service 500.

Compressed File Registration Processing

Figure 18:
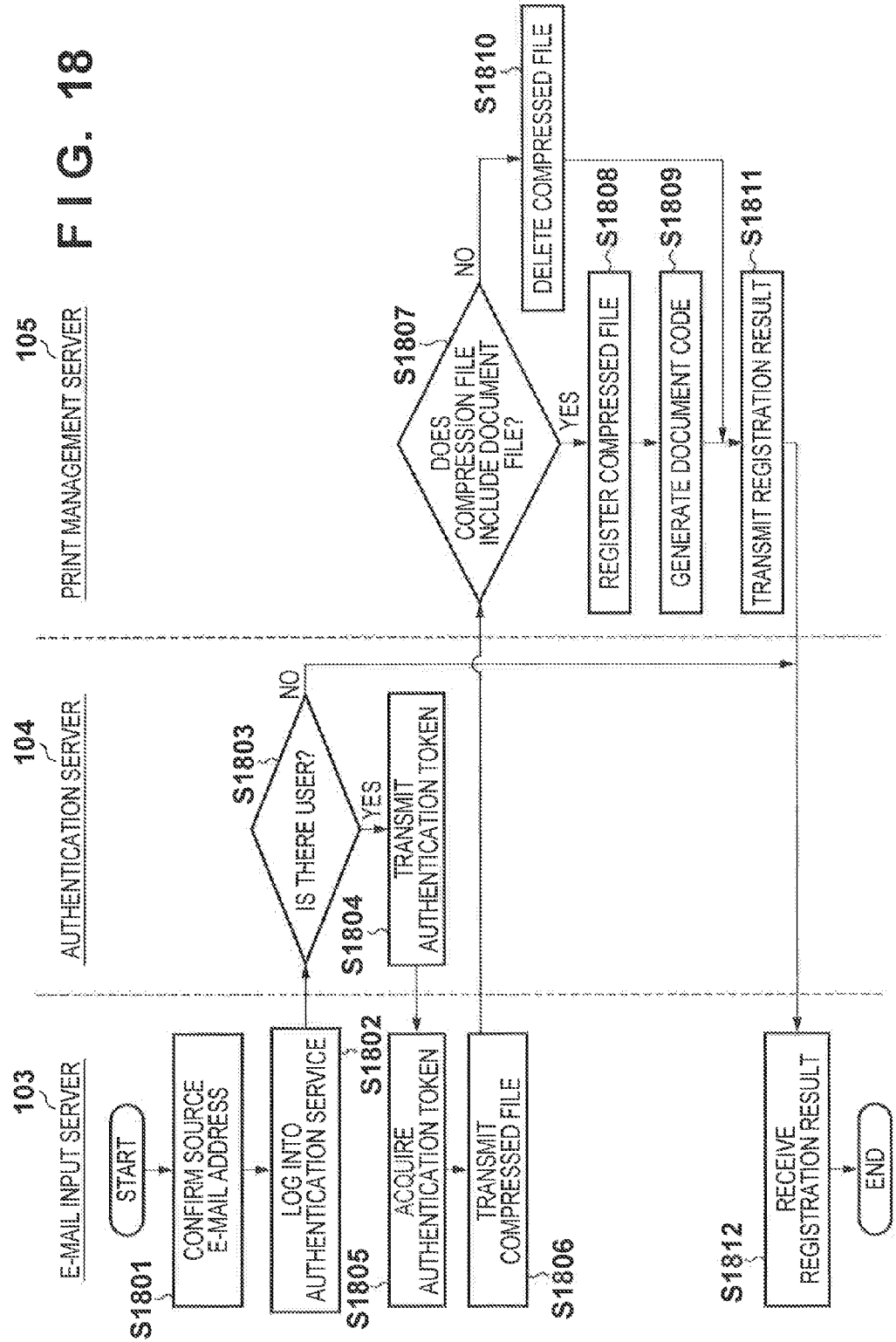
FIG. 18 is a diagram illustrating a procedure for processing of registering a compressed file in the print management service.

FIG. 18 is a flowchart illustrating a procedure for processing of the e-mail input service 300 registering, in step S1711, a compressed file attached to an e-mail in the print management service 500. The processing up to the e-mail input service 300 logging into the authentication service 400, specifically, processing in steps S1801 to S1805 is the same as that in steps S901 to S905 described in Embodiment 1.

In step S1806, the e-mail input service 300 transmits the compressed file attached to the e-mail to the print management service 500 with an authentication token acquired in step S1806, thereby registering the compressed file. In step S1807, the print management service 500 confirms header information of the compressed file received from the e-mail input service 300, and determines whether the compressed file includes document data in a printable format.

Here, if it has been determined that the compressed file does not include document data in a printable format, in step S1810, processing of deleting the compressed file received from the e-mail input service 300 is performed, and a registration result notifying that the compressed file does not include document data in a printable format is generated. On the other hand, if it has been determined that the compressed file includes document data in a printable format, in step S1808, the compressed file is registered in the document management database 504.

Figure 19:
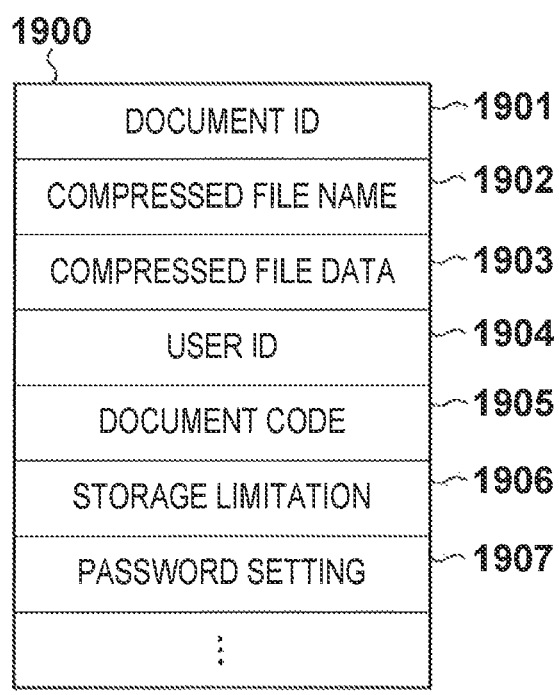
FIG. 19 shows an example of a data structure of compressed file information.

FIG. 19 shows an example of compressed file information that the print management service 500 registers in the document management database 504 in step S1808. Compressed file information 1900 includes a document ID 1901 for uniquely identifying a compressed file on the database, a compressed file name 1902 that is the display name of the compressed file, and compressed file data 1903 storing binary of the compressed file data. In addition, the compressed file information 1900 includes a user ID 1904 of a user who has registered the compressed file, a document code 1905 for identifying the compressed file at the time of expansion confirmation to be described later, and a storage limitation 1906 of the compressed file. Furthermore, the compressed file information 1900 includes a password setting 1907 indicating whether a password is set for the compressed file. With respect to the compressed file data 1903, the binary of the compressed file data may be stored directly in the document management database 504 as with the document data 703 shown in FIG. 7, or instead, the binary may be stored in a different region (not shown) on the document management database 504, and the information indicating the storage location may be stored.

The print management service 500 specifies the user information 600 from the authentication database 403 using the authentication token received from the e-mail input service 300 with the compressed file. The print management service 500 interprets the user corresponding to the specified user information 600 as the user authenticated when the compressed file was registered, and registers the user ID and the compressed file in the document management database 504 in association with each other. Upon registration of the compressed file, the print management service 500 issues the document ID 1901 identifying the compressed file, acquires the compressed file name 1902 from the compressed file data, and the password setting 1907 indicating whether a password is set for the compressed file.

FIG. 18 is referred to again. In step S1809, the print management service 500 generates the document code 1905 corresponding to the document ID 1901. The document code 1905 is, similar to the document ID 1901, a unique value used for searching for compressed file data managed by the document management database 504, and is used as a URL parameter for the mobile terminal 108 to display an input confirmation screen to be described below. As a method of generating the document code 1905, a method of concatenating, in the compressed file information 1900, the document ID 1901 with at least one document information element, a method of concatenating the document ID 1901 with a hash value of the document data 1903, or the like may be used, and there is no limitation to the generation method.

In step S1811, the print management service 500 transmits the document code 1905 generated in step S1809 to the e-mail input service 300 with the registration success result. In step S1812, the e-mail input service 300 acquires the registration result from the print management service 500.

FIG. 17 is referred to again. If registration of the document in the print management service 500 has succeeded, in step S1712, the e-mail input service 300 creates an e-mail (third or fourth e-mail) that includes a text notifying that registration of the compressed file has been completed. Here, the e-mail input service 300 generates a URL link to an expansion confirmation screen (to be described below) having the document code 1905 acquired in step S1809 as a URL parameter, and indicates the URL link in the text of the e-mail. In step S1713, the e-mail input service 300 transmits the e-mail created in step S1704, S1706, S1710 or S1712 to the mobile terminal 108 via the e-mail server 102, as a result of registration processing performed on the file attached to the e-mail acquired in step S1702. In step S1714, the mobile terminal 108 inquires to the e-mail server 102 about whether an e-mail has been newly received at a predetermined interval, and receives the e-mail transmitted by the e-mail input service 300 in step S1713.

FIGS. 20A and 20B each show an example of the text of a confirmation e-mail for expanding the compressed file created in step S1712. A compressed file registration success e-mail 2001 shown in FIG. 20A indicates the text of the confirmation e-mail for expanding the compressed file created in step S1712 when the e-mail input service has received a registration success result of the compressed file from the print management service 500 in step S1812. The compressed file registration success e-mail 2001 is configured to include a successful registration message portion 2002, an expansion confirmation page URL portion 2003 and a document code portion 2004 of the compressed file. Here, the expansion confirmation page URL portion 2003 indicates a URL to be accessed by the mobile terminal 108 at the time of expansion confirmation to be described later, and the document code portion 2004 indicates the document code of the compressed file generated in step S1809.

A compressed file registration failure e-mail 2005 shown in FIG. 20B indicates the text of a confirmation e-mail for expanding the compressed file that is created in step S1712 when the e-mail input service has received in step S1812 a result of failure of registration of compressed file from the print management service 500. Specifically, the compressed file registration failure e-mail 2005 is created if it has been determined in step S1807 that the compressed file does not include document data. The compressed file registration failure e-mail 2005 is configured to include a registration failure message portion 2006. Through the procedure described above, in the e-mail input service 300, a compressed file attached to an e-mail can be registered in the print management service 500.

Confirmation of Input

FIG. 21 is a flowchart illustrating a procedure for processing of confirming input of the compressed file registered in the print management service 500 through the processing illustrated in FIG. 17 in the mobile terminal 108. Note that the same description provided in FIG. 8 applies to the processing of confirming input of document data registered by the processing illustrated in FIG. 17.

In step S2101, the mobile terminal 108 accesses the expansion confirmation screen URL indicated in the compressed file registration success e-mail 2001 received in step S1714, using a Web browser provided therein. In step S2102, when the print management service 500 has accepted a Web access to the expansion confirmation screen from the mobile terminal 108, the print management service 500 redirects the Web access from the mobile terminal 108 to an authentication screen (not shown) created by the authentication service 400. In step S2103, the mobile terminal 108 executes a Web access including a user ID and a password as authentication information to log into the authentication service 400. In step S2104, the authentication service 400 searches the authentication database 403 and determines whether a user corresponding to the user ID and the password accepted from the mobile terminal 108 is present.

Here, if it has been determined that there is no user who corresponds to the user ID and the password accepted from the mobile terminal 108, in step S2116, the authentication service 400 transmits an authentication failure screen (not shown) notifying a login failure to the mobile terminal 108, and ends this processing. In contrast, if it has been determined that there is a user who corresponds to the user ID and the password accepted from the mobile terminal 108, the authentication service 400 transmits an authentication token of that user to the print management service 500, and thereby notifies that the user has been logged in. In step S2105, the print management service 500 creates an expansion confirmation screen for the compressed file associated with the authenticated user.

FIG. 22 is a flowchart illustrating a procedure for processing of the print management service 500 creating the expansion confirmation screen for a compressed file associated with an authenticated user in step S2105. In step S2201, the print management service 500 searches the document management database 504 for the compressed file information 1900 corresponding to the user ID of the authenticated user, thereby acquiring the compressed file information 1900. In step S2202, the print management service 500 creates a compressed file expansion confirmation screen using the compressed file information 1900 acquired in step S2201. In step S2203, the print management service 500 confirms the password setting 1907 in the compressed file information 1900 acquired in step S2201, and determines whether a password is set. Here, if it has been determined that a password is not set, this processing ends. In contrast, if it has been determined that a password is set, in step S2204, the print management service 500 adds a password input area (to be described later) to the compressed file expansion confirmation screen created in step S2202.

FIG. 23 shows an example of a compressed file expansion confirmation (confirmation of starting extraction processing (decompression)) screen created by the print management service 500 in step S2202. In this embodiment, the extraction processing means that the compressed file is decompressed. A compressed file expansion confirmation screen 2300 is configured to include a user name display label 2301, a compressed file information list 2302, an expanded file selection check box 2303, and an expansion confirmation button 2306. The user name display label 2301 displays, from among the user information managed by the authentication database 403, the user name of an authenticated user. The compressed file information list 2302 displays each item of the compressed file information associated with the authenticated user, from among the compressed file information managed by the document management database 504. At this time, if the password setting 1907 in the compressed file information 1900 has saved therein information indicating that a password is set for the compressed file, information that a password is set is displayed in an area 2304 for displaying whether or not a password is set, and also a password input area 2305 is displayed. Using the password input area 2305, the user can return the password to the print management server 105. The expanded file selection check box 2303 is used when designating a document whose input is to be confirmed. The expansion confirmation button 2306 is pressed when expanding of the compressed file selected by the expanded file selection check box 2303 (extraction processing) is confirmed. That is, by pressing the expansion confirmation button 2306, it is possible to return the intention of the user to start extraction processing of the compressed file to the print management server 105. With the pressing of the expansion confirmation button 2306 serving as a trigger, the print management service 500 expands the compressed file designated by the expanded file selection check box 2303.

FIG. 21 is referred to again. In step S2106, the print management service 500 transmits the expansion confirmation screen created in step S2105 to the mobile terminal 108 as a replay. In step S2107, the mobile terminal 108 acquires the expansion confirmation screen from the print management service 500, and displays the screen on the Web browser provided therein. In step S2108, the mobile terminal 108 selects a compressed file to be expanded through the Web browser provided therein, and transmits a Web access to the print management service 500. At this time, if a password is set for the compressed file to be expanded, a predetermined password is input in the password input area 2305, and transmitted to the print management service 500 with the Web access. In step S2109, when the print management service 500 has accepted the Web access including information on the compressed file to be expanded from the mobile terminal 108, the print management service 500 expands the corresponding compressed file, and registers the document data in the document management database 504.

Figure 24:
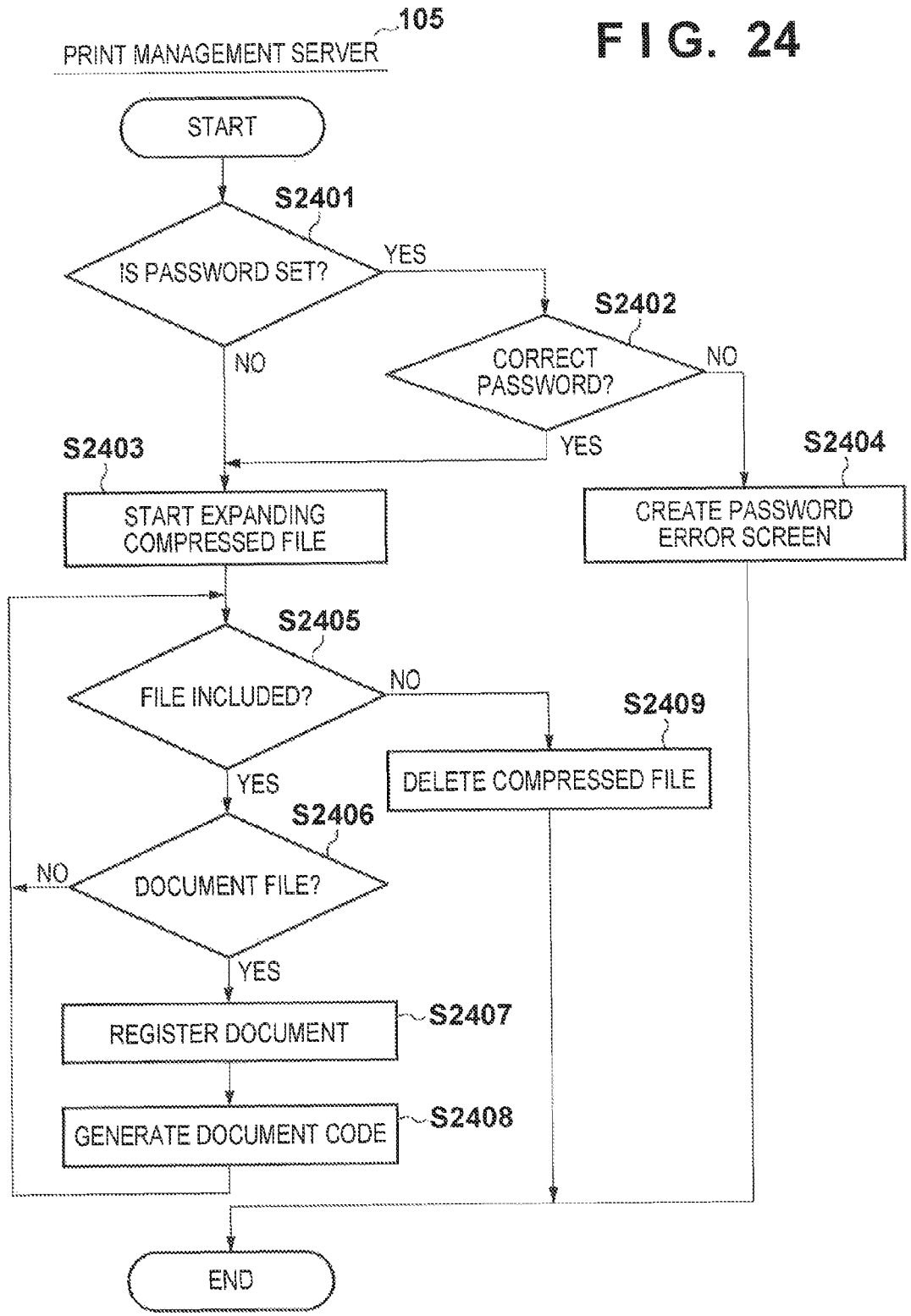
FIG. 24 is a diagram illustrating a procedure for processing of expanding a compressed file in the print management service.

FIG. 24 is a flowchart illustrating a procedure for the print management service 500 expanding the compressed file and registering the document data in the document management database 504 in step S2109. In step S2401, the print management service 500 determines whether a password is set for the compressed file to be expanded that has been selected in step S2108, by referencing the corresponding compressed file information 1900.

Here, if it has been determined that a password is not set for the compressed file to be expanded, the print management service 500 starts expansion processing of the compressed file in step S2403. In contrast, if it has been determined that a password is set for the compressed file to be expanded, in step S2402, the print management service 500 determines whether the compressed file can be expanded with the password received with the Web access in step S2109 from the mobile terminal. If it has been determined that the compressed file can be expanded with the password received in step S2109, in step S2403, expansion processing of the compressed file is started. In contrast, if it has been determined that the compressed file to be processed cannot be expanded with the password received in step S2109 from the mobile terminal, in step S2404, a password error screen (unshown) is created and the expansion processing is interrupted. Then, the print management service 500 transmits the password error screen to the mobile terminal 108 as a response.

In step S2403, the print management service 500 starts expansion processing of the compressed file to be processed. In the expansion processing, the processing from steps S2405 to S2409 is repeated for the number of times corresponding to the number of document data pieces included in the compressed file. In step S2405, the print management service 500 determines whether there is any file that has not been expanded in the compressed file. If it has been determined that there is no file that has not been expanded, in other words, all the files have been expanded, in step S2409, the print management service deletes the compressed file and compressed file information relating thereto from the document management database 504, and ends the expansion processing. On the other hand, if it has been determined in step S2405 that there is a file that has not been expanded, the print management service 500 performs expansion processing for that compressed file, and advances to step S2406.

In step S2406, the print management service 500 determines whether the file expanded in step S2405 is document data in a printable format. If it has been determined that the file expanded in step S2405 is not document data in a printable format, the expanded file is deleted, and the procedure returns to step S2405. In contrast, if it has been determined that the file expanded in step S2405 is document data in a printable format, in step S2407, the expanded document data is registered in the document management database 504. The processing of registering document data performed here is the same as that in step S907 described in Embodiment 1. Next, in step S2408, the print management service 500 generates a document code corresponding to the document ID of the document data registered in step S2407. The processing of generating document code performed here is the same as that in step S908 described in Embodiment 1.

FIG. 21 is referred to again. When the expansion processing of the compressed file has been completed in step S2109, in step S2110, the print management service 500 creates an input confirmation screen corresponding to the expanded document. The processing flow for creating the input confirmation screen performed in step S2110 is the same as that shown in FIG. 12 in Embodiment 1. The processing from steps S2111 to S2116 is the same as that in steps S1106 to S1111 shown in FIG. 11 in Embodiment 1.

In the present embodiment, even if a compressed file including a plurality of document data pieces is attached to an e-mail received from the user, it is possible to perform printing via a predetermined printer. In the present embodiment, for performing printing, the client 107 and the mobile terminal 108 are not required to perform processing of expanding a compressed file in advance.

Embodiment 3

In Embodiment 3, even if a password is set for a document attached to an e-mail transmitted from the mobile terminal 108 to the e-mail input service 300, it is possible to perform printing with a predetermined printer via the print management service 500. A series of processes from registration of a document in the print management service 500 to printing of the document with a printer is basically the same that in Embodiment 1. Only points different from Embodiment 1 will be described below.

Figure 25:
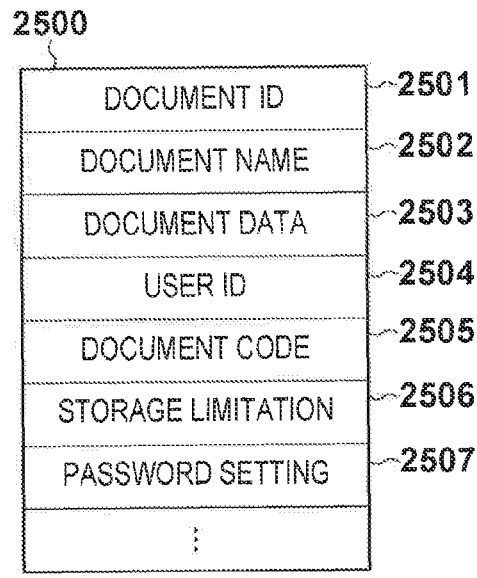
FIG. 25 shows an example of document information for which a password is set.

A procedure for processing of the e-mail input service 300 acquiring an e-mail with a document for which a password is set attached from the mobile terminal 108 is the same as that illustrated in FIGS. 8 and 9. FIG. 25 shows an example of the document information of a document for which a password is set and that is managed by the document management database 504 in step S907. Document information 2500 of a document for which a password is set includes a document ID 2501 for uniquely identifying a document on the database, a document name 2502 that is a display name of the document, and document data 2503 storing binary of the document data. Further, the document information 2500 includes a user ID 2504 of the user who has registered the document, a document code 2505 for identifying the document at the time of input confirmation, which will be described later, a storage limitation 2506 of the document, and a password setting 2507.

The descriptions of the document ID 2501 to the document storage limitation 2506 are the same as those provided for the constituent elements shown in FIG. 7. The print management service 500 confirms header information of the document for which a password is set to determine whether a password is set, and saves the determination result in step S907. The processing of confirming input of the document registered in the print management service 500 in the mobile terminal 108 is the same as that illustrated in FIG. 11. Note that the processing of creating an input confirmation screen performed by the print management service 500 in step S1105 differs from that in Embodiment 1.

Figure 26:
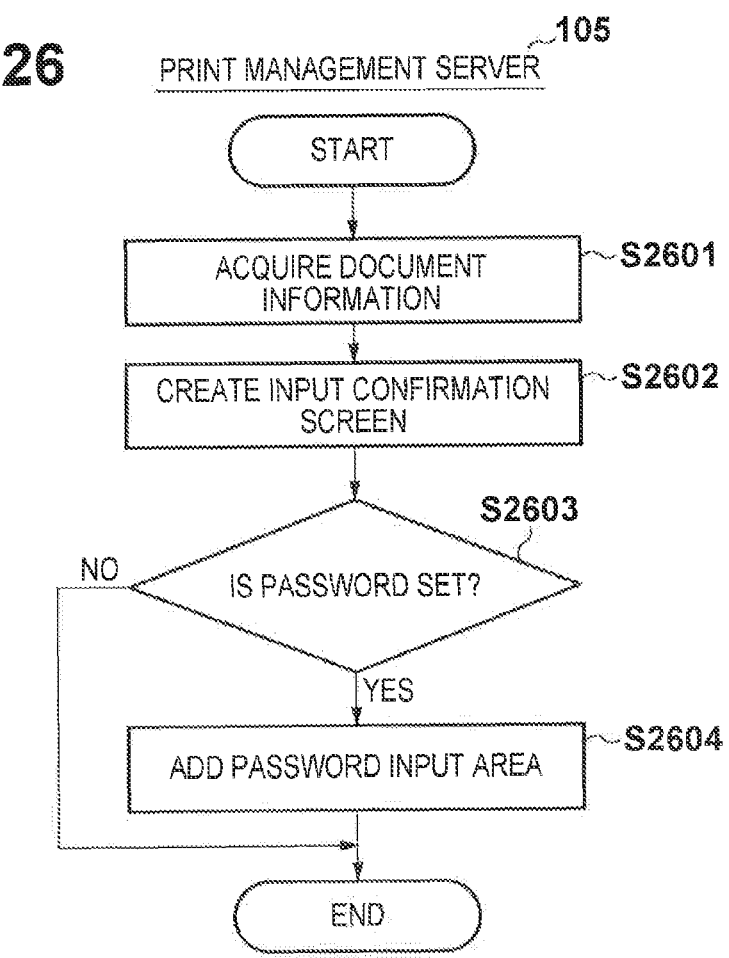
FIG. 26 is a diagram illustrating a procedure for processing of generating an input confirmation screen in the case where a password is set.

FIG. 26 is a flowchart illustrating a procedure for processing of the print management service 500, in the present embodiment, creating an input confirmation screen of a document associated with an authenticated user. In step S2601, the print management service 500 searches the document management database 504 for document information corresponding to the user ID of an authenticated user, and thereby acquires document information. In step S2602, the print management service 500 creates an input confirmation screen using the document information acquired in step S1201. At this time, the print management service 500 determines in step S2603 whether the acquired document information is document information 2500 for which a password is set. Specifically, whether a password is set for the document to be processed is determined by confirming the password setting 2507.

Here, if it has been determined that a password is not set for the document to be processed, this processing ends. In contrast, if it has been determined that a password is set for the document to be processed, in step S2604, the print management service 500 adds a password input area (to be described later) in the input confirmation screen created in step S2602, and ends this processing. An input confirmation screen for a document for which a password is set used in the case where the password input area has been added in step S2604 is displayed in a form achieved by adding password setting information 2701 and a password input area 2702 to the input confirmation screen shown in FIG. 13.

In the present embodiment, even if a document for which a password is set is attached to an e-mail received from the user, it is possible to perform printing via a predetermined printer. For performing printing, the client 107 and the mobile terminal 108 are not required to perform processing in advance such as cancellation of a password setting for a document.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2011-100133, filed Apr. 27, 2011, which is hereby incorporated by reference herein in its entirety.

What is claimed is:

1. A printing control method executed in a printing system comprising a terminal, a server, and a printing apparatus, the method comprising:
    transmitting, by the terminal, a first e-mail to which a file to be printed is attached to the server;
    receiving, by the server, the first e-mail;
    temporarily saving, by the server, the file attached to the first e-mail;
    transmitting, by the server, a second e-mail for confirming a user to the terminal;
    receiving, by the terminal, the second e-mail;
    returning, by the terminal, information on the user to the server in response to the second e-mail;
    acquiring, by the server, the information on the user;
    converting, by the server, the temporarily saved file into a file for printing and registering the converted file in the server after the information on the user is acquired; and
    transmitting, by the server, the registered file to the printing apparatus to cause the printing apparatus to perform printing of the registered file.

2. The printing control method according to claim 1, wherein the file is a compressed file, the method further comprising:
    transmitting, by the server, a third e-mail for accepting an instruction to start decompression of the compressed file to the terminal;
    returning, by the terminal, the instruction to the server in response to the third e-mail;
    accepting, by the server, the instruction; and
    decompressing, by the server, the temporarily saved, compressed file after the instruction is accepted; and
    transmitting the second e-mail to the terminal after the compressed file is decompressed.

3. The printing control method according to claim 2, wherein transmitting, by the server, the third e-mail further comprises:
    determining whether a password is set for the file; and
    transmitting a fourth e-mail for acquiring the password to the terminal in a case where it is determined that the password is set,
    wherein the password is returned to the server in response to the fourth e-mail, and
    wherein, when the instruction is accepted and the password is acquired, the temporarily saved, compressed file is decompressed.

4. The printing control method according to claim 1, wherein the second e-mail includes a URL for linking to a Web page, and
    wherein the user accesses the URL, and the information on the user is returned to the server on the Web page.

5. A printing system comprising a terminal, a server and a printing apparatus, wherein the terminal comprises:
- a first transmission unit configured to transmit a first e-mail to which a file to be printed is attached to the server;
- a second reception unit configured to receive a second e-mail for confirming a user from the server; and
- a returning unit configured to return information on the user to the server in response to the second e-mail, and wherein the server comprises:
- a first reception unit configured to receive the first e-mail from the terminal;
- a saving unit configured to temporarily save the file attached to the first e-mail;
- a second transmission unit configured to transmit the second e-mail to the terminal;
- an acquiring unit configured to acquire the information on the user;
- a registration unit configured to convert the file temporarily saved by the saving unit into a file for printing and register the converted file in the server after the information on the user is acquired by the acquiring unit; and
- a print control unit configured to transmit the file for printing that is registered by the registration unit to the printing apparatus to cause the printing apparatus to perform printing of the file.

6. A server capable of communicating with a terminal and a printing apparatus, comprising:
- a first reception unit configured to receive a first e-mail to which a file to be printed is attached from the terminal;
- a saving unit configured to temporarily save the file attached to the first e-mail;
- a second transmission unit configured to transmit a second e-mail for confirming a user to the terminal;
- an acquiring unit configured to acquire information on the user;
- a registration unit configured to convert the file temporarily saved by the saving unit into a file for printing and register the converted file in the server after the information on the user is acquired by the acquiring unit; and
- a print control unit configured to transmit the file for printing that is registered by the registration unit to the printing apparatus to cause the printing apparatus to perform printing of the file.

* * * * *